(12) United States Patent
Lindsay

(10) Patent No.: US 12,509,720 B2
(45) Date of Patent: Dec. 30, 2025

(54) METHODS FOR SEQUENCING BIOPOLYMERS

(71) Applicant: ARIZONA BOARD OF REGENTS ON BEHALF OF ARIZONA STATE UNIVERSITY, Scottsdale, AZ (US)

(72) Inventor: Stuart Lindsay, Scottsdale, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 1078 days.

(21) Appl. No.: 17/246,123

(22) Filed: Apr. 30, 2021

(65) Prior Publication Data

US 2021/0340614 A1    Nov. 4, 2021

Related U.S. Application Data

(60) Provisional application No. 63/018,352, filed on Apr. 30, 2020.

(51) Int. Cl.
| | | |
|---|---|---|
| C12Q 1/6869 | (2018.01) | |
| G01N 27/04 | (2006.01) | |
| G01N 33/483 | (2006.01) | |

(52) U.S. Cl.
CPC ........... *C12Q 1/6869* (2013.01); *G01N 27/04* (2013.01); *G01N 33/4833* (2013.01)

(58) Field of Classification Search
CPC . C12Q 1/6869; C12Q 2565/531; G01N 27/04
See application file for complete search history.

(56) References Cited

U.S. PATENT DOCUMENTS

| | | | |
|---|---|---|---|
| 5,198,543 A | 3/1993 | Blanco | |
| 6,391,558 B1 | 5/2002 | Henkens et al. | |
| 6,824,974 B2 | 11/2004 | Pisharody et al. | |
| 7,632,671 B2 | 12/2009 | Tong | |
| 7,785,785 B2 | 8/2010 | Pourmand et al. | |
| 8,628,649 B2 | 1/2014 | Lindsay et al. | |
| 8,753,893 B2 | 6/2014 | Liu et al. | |
| 8,961,757 B2 | 2/2015 | Nuckolls et al. | |
| 8,968,540 B2 | 3/2015 | Reinhart et al. | |
| 9,140,682 B2 | 9/2015 | Lindsay et al. | |
| 9,274,430 B2 | 3/2016 | Gyarfas et al. | |
| 9,376,713 B2 | 6/2016 | Bashir et al. | |
| 9,395,352 B2 | 7/2016 | Lindsay et al. | |
| 9,593,372 B2 | 3/2017 | Lindsay et al. | |
| 9,766,248 B2 | 9/2017 | Lindsay et al. | |
| 9,810,681 B2 | 11/2017 | Lindsay et al. | |
| 9,938,586 B2 | 4/2018 | Liang et al. | |
| 10,036,064 B2 | 7/2018 | Merriman et al. | |
| 10,047,392 B2 | 8/2018 | Ivankin et al. | |
| 10,051,722 B2 | 8/2018 | Yamamoto et al. | |
| 10,227,694 B2 | 3/2019 | Jin et al. | |
| 10,378,103 B2 | 8/2019 | Jin et al. | |
| 10,379,102 B2 | 8/2019 | Lindsay et al. | |
| 10,422,787 B2 | 9/2019 | Lindsay et al. | |
| 10,508,296 B2 | 12/2019 | Merriman et al. | |
| 10,526,696 B2 | 1/2020 | Jin et al. | |
| 10,584,410 B2 | 3/2020 | Jin et al. | |
| 10,597,767 B2 | 3/2020 | Merriman et al. | |
| 10,648,941 B2 | 5/2020 | Merriman et al. | |
| 10,712,334 B2 | 7/2020 | Choi et al. | |
| 10,737,263 B2 | 8/2020 | Choi et al. | |
| 10,913,966 B2 | 2/2021 | Merriman et al. | |
| 11,630,098 B2 | 4/2023 | Lindsay et al. | |
| 11,808,755 B2 | 11/2023 | Lindsay et al. | |
| 11,959,905 B2 | 4/2024 | Lindsay et al. | |
| 2003/0064390 A1 | 4/2003 | Schuelein et al. | |
| 2003/0098248 A1 | 5/2003 | Vogel et al. | |
| 2003/0124572 A1 | 7/2003 | Umek et al. | |
| 2004/0146863 A1 | 7/2004 | Pisharody et al. | |
| 2004/0249124 A1 | 12/2004 | Caruso et al. | |
| 2005/0074871 A1 | 4/2005 | Albert et al. | |
| 2005/0266456 A1 | 12/2005 | Williams et al. | |
| 2005/0285275 A1 | 12/2005 | Son et al. | |
| 2006/0154489 A1 | 7/2006 | Tornow et al. | |
| 2008/0218184 A1 | 9/2008 | White et al. | |
| 2009/0017571 A1 | 1/2009 | Nuckolls et al. | |
| 2009/0215156 A1 | 8/2009 | Chung et al. | |
| 2009/0226899 A1 | 9/2009 | Chen | |

(Continued)

FOREIGN PATENT DOCUMENTS

| | | |
|---|---|---|
| CN | 1325490 A | 12/2001 |
| CN | 1916630 A | 2/2007 |
| CN | 101365827 A | 2/2009 |
| CN | 101400800 A | 4/2009 |
| CN | 102414560 A | 4/2012 |
| CN | 104105797 A | 10/2014 |
| CN | 104359946 | 2/2015 |
| CN | 104955958 A | 9/2015 |
| CN | 105283560 A | 1/2016 |
| CN | 105378113 A | 3/2016 |
| CN | 107082792 A | 8/2017 |
| CN | 107666962 A | 2/2018 |
| CN | 107683337 A | 2/2018 |
| CN | 108018270 A | 5/2018 |
| CN | 109154024 A | 1/2019 |

(Continued)

OTHER PUBLICATIONS

Chen et al., "Palladium as electrode in DNA sequencing," Aug. 9, vol. 103, pp. 1-4. (Year: 2013).*

(Continued)

*Primary Examiner* — Young J Kim
(74) *Attorney, Agent, or Firm* — Casimir Jones, S.C.; Peter J. Schlueter

(57) ABSTRACT

The present disclosure provides devices, systems, and methods related to sequencing a biopolymer. In particular, the present disclosure relates to methods for sequencing a polynucleotide using a bioelectronic device that obtains a bioelectronic signature (e.g., current amplitude levels) of polymerase activity based on current fluctuations as complementary nucleotidepolyphosphate monomers (e.g., having distinct charges) are incorporated into the template polynucleotide.

10 Claims, 6 Drawing Sheets

(56) References Cited

U.S. PATENT DOCUMENTS

| | | |
|---|---|---|
| 2009/0295372 A1 | 12/2009 | Krstic et al. |
| 2010/0084276 A1 | 4/2010 | Lindsay |
| 2010/0184062 A1 | 7/2010 | Steinmuller-Nethl et al. |
| 2010/0206731 A1 | 8/2010 | Lau et al. |
| 2010/0285514 A1 | 11/2010 | Claussen et al. |
| 2011/0098218 A1 | 4/2011 | Han et al. |
| 2011/0166034 A1 | 7/2011 | Kwong et al. |
| 2011/0312529 A1 | 12/2011 | He et al. |
| 2012/0228386 A1 | 9/2012 | Wu et al. |
| 2012/0258870 A1 | 10/2012 | Schwartz et al. |
| 2012/0288948 A1 | 11/2012 | Lindsay et al. |
| 2013/0109577 A1 | 5/2013 | Korlach et al. |
| 2013/0302901 A1 | 11/2013 | Lindsay et al. |
| 2014/0141525 A1 | 5/2014 | Albert et al. |
| 2014/0231274 A1 | 8/2014 | Oki et al. |
| 2015/0010935 A1 | 1/2015 | Lindsay et al. |
| 2015/0017655 A1 | 1/2015 | Huang et al. |
| 2015/0086994 A1 | 3/2015 | Williams et al. |
| 2015/0142327 A1 | 5/2015 | Ashcroft et al. |
| 2015/0144506 A1 | 5/2015 | Lindsay et al. |
| 2015/0285818 A1 | 10/2015 | Banala et al. |
| 2015/0362459 A1 | 12/2015 | Chung et al. |
| 2016/0018384 A1 | 1/2016 | Lindsay et al. |
| 2016/0025702 A1 | 1/2016 | Lindsay et al. |
| 2016/0082739 A1 | 3/2016 | Takagiwa |
| 2016/0083789 A1 | 3/2016 | Turner et al. |
| 2016/0097759 A1 | 4/2016 | Lindsay et al. |
| 2016/0108002 A1 | 4/2016 | Zhang et al. |
| 2016/0146828 A1 | 5/2016 | Lindsay et al. |
| 2016/0177383 A1 | 6/2016 | Ashcroft et al. |
| 2016/0194698 A1 | 7/2016 | Lindsay |
| 2016/0258925 A1 | 9/2016 | Gyarfas et al. |
| 2016/0280723 A1 | 9/2016 | Zhang et al. |
| 2016/0282295 A1 | 9/2016 | Wang et al. |
| 2016/0319343 A1 | 11/2016 | Korlach et al. |
| 2017/0003245 A1 | 1/2017 | Lindsay et al. |
| 2017/0016852 A1 | 1/2017 | Lindsay et al. |
| 2017/0037462 A1 | 2/2017 | Turner et al. |
| 2017/0038333 A1 | 2/2017 | Turner et al. |
| 2017/0038369 A1 | 2/2017 | Lindsay et al. |
| 2017/0044605 A1 | 2/2017 | Merriman et al. |
| 2017/0067902 A1 | 3/2017 | Zhang et al. |
| 2017/0121761 A1* | 5/2017 | Eichen ............... G01N 33/5438 |
| 2017/0137389 A1 | 5/2017 | Zhang et al. |
| 2017/0168039 A1 | 6/2017 | Lindsay et al. |
| 2017/0204066 A1 | 7/2017 | Lindsay et al. |
| 2017/0276678 A1 | 9/2017 | Ervin et al. |
| 2017/0343558 A1 | 11/2017 | Lindsay et al. |
| 2018/0031549 A1 | 2/2018 | Chen et al. |
| 2018/0051332 A9 | 2/2018 | Esfandyarpour et al. |
| 2018/0073071 A1 | 3/2018 | Ju et al. |
| 2018/0095081 A1 | 4/2018 | Albert et al. |
| 2018/0120286 A1 | 5/2018 | Lindsay et al. |
| 2018/0155773 A1 | 6/2018 | Gunderson et al. |
| 2018/0180567 A1 | 6/2018 | Li et al. |
| 2018/0305727 A1 | 10/2018 | Merriman et al. |
| 2018/0340220 A1 | 11/2018 | Merriman et al. |
| 2019/0004003 A1 | 1/2019 | Merriman et al. |
| 2019/0041355 A1 | 2/2019 | Merriman et al. |
| 2019/0094175 A1 | 3/2019 | Merriman et al. |
| 2019/0112643 A1 | 4/2019 | Aran et al. |
| 2019/0234902 A1 | 8/2019 | Lima, Jr. et al. |
| 2019/0309008 A1 | 10/2019 | Ju et al. |
| 2019/0317040 A1 | 10/2019 | Lindsay et al. |
| 2019/0330695 A1 | 10/2019 | Guo et al. |
| 2019/0376135 A1 | 12/2019 | Mandell et al. |
| 2020/0157595 A1 | 5/2020 | Merriman et al. |
| 2021/0114025 A1 | 4/2021 | De Freitas Dias et al. |
| 2021/0208127 A1* | 7/2021 | Lindsay .................. C12Q 1/005 |
| 2021/0269869 A1* | 9/2021 | Lindsay .................. G16B 30/20 |
| 2021/0325379 A1* | 10/2021 | Lindsay ............... G01N 27/021 |
| 2021/0372986 A1* | 12/2021 | Lindsay ............. G01N 33/5438 |
| 2022/0098635 A1 | 3/2022 | Lindsay et al. |
| 2022/0196646 A1* | 6/2022 | Lindsay ............. G01N 33/5438 |
| 2022/0252542 A1 | 8/2022 | Merriman et al. |
| 2022/0316002 A1* | 10/2022 | Lindsay ............... C12N 9/1252 |
| 2022/0389502 A1* | 12/2022 | Lindsay .................. C12Q 1/005 |
| 2023/0243807 A1* | 8/2023 | Lindsay ............. G01N 27/3278 |
| | | 204/403.01 |

FOREIGN PATENT DOCUMENTS

| | | |
|---|---|---|
| CN | 109891233 A | 6/2019 |
| EP | 3976814 A1 | 4/2022 |
| JP | H01248570 A | 10/1989 |
| JP | H0719927 B2 | 3/1995 |
| JP | 2012021972 A | 2/2012 |
| JP | 2016188794 A | 11/2016 |
| JP | 2018500905 A | 1/2018 |
| TW | 201409690 A | 3/2014 |
| WO | WO-9931503 A1 | 6/1999 |
| WO | WO-2012050533 A1 | 4/2012 |
| WO | WO 2013/038272 | 3/2013 |
| WO | WO 2013/154999 | 10/2013 |
| WO | WO 2014/074727 | 5/2014 |
| WO | WO 2015/130781 | 9/2015 |
| WO | WO 2015/131073 | 9/2015 |
| WO | WO 2015/161119 | 10/2015 |
| WO | WO 2015/170784 | 11/2015 |
| WO | WO 2016/100635 | 6/2016 |
| WO | WO 2016/161402 | 10/2016 |
| WO | WO 2016/210386 | 12/2016 |
| WO | WO-2017042038 A1 | 3/2017 |
| WO | WO 2017/084998 | 5/2017 |
| WO | WO 2017/123416 | 7/2017 |
| WO | WO-2017132567 A1 * | 8/2017 ........... C12Q 1/6869 |
| WO | WO-2017132586 A1 * | 8/2017 ............. B82Y 15/00 |
| WO | WO-2017148861 A1 | 9/2017 |
| WO | WO 2017/189930 | 11/2017 |
| WO | WO 2018/026855 | 2/2018 |
| WO | WO-2018098286 A1 * | 5/2018 .......... B01J 19/0046 |
| WO | WO 2018/132457 | 7/2018 |
| WO | WO 2018/200687 | 11/2018 |
| WO | WO 2018/208505 | 11/2018 |
| WO | WO 2019/046589 | 3/2019 |
| WO | WO 2019/086305 | 5/2019 |
| WO | WO-2019161381 A1 | 8/2019 |
| WO | WO 2019/211622 | 11/2019 |
| WO | WO 2019/217600 | 11/2019 |
| WO | WO-2019222527 A1 * | 11/2019 ............. C12Q 1/005 |
| WO | WO 2020/160300 | 8/2020 |
| WO | WO-2020160300 A9 | 10/2020 |
| WO | WO 2020/243207 | 12/2020 |
| WO | WO 2020/257654 A1 | 12/2020 |
| WO | WO 2021/163275 A1 | 8/2021 |
| WO | WO 2021/173681 A1 | 9/2021 |
| WO | WO 2021/222791 | 11/2021 |

OTHER PUBLICATIONS

Zhang et al., "Engineering an Enzyme for Direct Electrical Monitoring of Activity," ACS Nano, published on-line Oct. 8, vol. 14, pp. 1360-1368. (Year: 2019).*

Zhang et al.., Supplemental Online Information, ACS Nano, published on-line Oct. 8, vol. 14, pp. 1-14. (Year: 2019).*

International Search Report and Written Opinion for PCT/US21/30239. Mailed Sep. 27, 2021. 10 pages.

Altschul et al., Basic local alignment search tool. J Mol Biol. Oct. 5, 1990;215(3):403-10.

Altschul et al., Gapped BLAST and PSI-BLAST: a new generation of protein database search programs. Nucleic Acids Res. Sep. 1, 1997;25(17):3389-402.

Amdursky et al., Solid-state electron transport via cytochrome c depends on electronic coupling to electrodes and across the protein. PNAS, Apr. 15, 2014, vol. 111, No. 15, pp. 5556-5561.

Dellafiore et al., Modified Nucleoside Triphosphates for In-vitro Selection Techniques. Front Chem. May 4, 2016;4:18.

Duffy et al., Modified nucleic acids: replication, evolution, and next-generation therapeutics. BMC Biology, Sep. 2, 2020. 18:112. 14 pages.

(56) References Cited

OTHER PUBLICATIONS

Fujino et al, Chimeric RNA Oligonucleotides Incorporating Triazole-Linked Trinucleotides: Synthesis and Function as mRNA in Cell-Free Translation Reactions. J Org Chem. Oct. 7, 2016;81(19):8967-8976.
Gonnet et al., Exhaustive matching of the entire protein sequence database. Science. Jun. 5, 1992;256(5062):1443-5.
Kyte et al., A simple method for displaying the hydropathic character of a protein. J Mol Biol. May 5, 1982;157(1):105-32.
Mckenzie et al., Recent progress in non-native nucleic acid modifications. Chem Soc Rev. Apr. 26, 2021;50(8):5126-5164.
Pearson. Using the FASTA program to search protein and DNA sequence databases. Methods Mol Biol. 1994;24:307-31.
Sambrook et al., Molecular Cloning: A Laboratory Manual, 3d ed., Cold Spring Harbor Press, 2001. TOC only. 23 pages.
Vaish et al., A novel, modification-dependent ATP-binding aptamer selected from an RNA library incorporating a cationic functionality. Biochemistry. Jul. 29, 2003;42(29):8842-51.
Zhang et al., Electronic Conductance Resonance in Non-Redox-Active Proteins. J Am Chem Soc. Apr. 1, 2020;142(13):6432-6438.
Ackerman et al., Massively multiplexed nucleic acid detection with Cas13. Nature. Jun. 2020;582(7811):277-282.
Adhikari et al., Conductivity of individual Geobacter pili. RSC Advances, 2016. 6: p. 8354-8357.
Alloway et al., Interface Dipoles Arising from Self-Assembled Monolayers on Gold: UV-Photoemission Studies of Alkanethiols and Partially Fluorinated Alkanethiols. J. Phys. Chem. B 2003, 107:11690-11699.
Amdursky et al., Electronic transport via proteins. Adv Mater. Nov. 12, 2014;26(42):7142-61.
Anzai et al., Avidin-biotin complexation for enzyme sensor applications, Trends in Analytical Chemistry, 1994, 13(5): 205-210.
Artes et al., Transistor-like Behavior of Single Metalloprotein Junctions. Nano Lett.,2012, 12(6), pp. 2679-2684 (publication date (Web): Oct. 5, 2011).
Aubert et al., Intraprotein radical transfer during photoactivation of DNA photolyase. Nature. Jun. 1, 2000;405(6786):586-90.
Ausubel et al. Current Protocols in Molecular Biology, John Wiley & Sons, New York, 1998. 19 pages.
Barhoumi et al., "Urease immobilization on biotinylated polypyrrole coated ChemFEC devices for urea biosensor development" IRBM, Apr. 1, 2008, 29(2-3): 192-201.
Bostick et al., Protein bioelectronics: a review of what we do and do not know. Rep Prog Phys. Feb. 2018;81(2):026601. 58 pages.
Castellarnau et al., "Integrated microanalytical system based on electrochemical detection and cell positioning" Materials Science and Engineering, 2006, 26: 405-410.
Chang et al., Chemical recognition and binding kinetics in a functionalized tunnel junction. Nanotechnology. Jun. 15, 2012;23(23):235101. 28 pages.
Chen et al., DNA sequencing using electrical conductance measurements of a DNA polymerase, Nature Nanotechnology, May 5, 2013, pp. 1-7; https://doi.org/10.1038/nnano.2013.71. 7 pages.
Chichil et al., Linkers in the structural biology of protein-protein interactions. Protein Sci. Feb. 2013;22(2):153-67.
Chin et al., Addition of p-Azido-I-phenylalanine to the Genetic Code of *Escherichia coli*. J. Am. Chem. Soc. 2002. 124,31, 9026-9027.
Choi et al. Site-specific inhibition of integrin alpha v beta 3-vitronectin association by a serasp-val sequence through an Arg-Gly-Asp-binding site of the integrin, Proteomics, vol. 10, Issue 1, No. Jan. 1, 2010, pp. 72-80 (First published Oct. 30, 2009).
Choi et al., Single-Molecule Lysozyme Dynamics Monitored by an Electronic Circuit, Science (2012) 335:319-324.
Cui et al., Reproducible measurement of single-molecule conductivity. Science. Oct. 19, 2001;294(5542):571-4.
Cui et al: Layer-by-layer 1 assembly of multilayer filme composed of avidin and biotin-labeled antibody for immunosensing, Biosensors and Bioelectronics, Jan. 1, 2003, 18(1): 59-67.

Disseration by Joshua Sadar, Top-Down and Bottom-Up Strategies to Prepare Nanogap Sensors for Controlling and Characterizing Single Biomolecules, Jul. 2019, 160 pages.
Fairhead et al., Plug-and-play pairing via defined divalent streptavidins. J Mol Biol. Jan. 9, 2014;426(1):199-214.
Fulton et al., Purification of monoclonal antibody against Ebola GP1 protein expressed in Nicotiana benthamiana. J Chromatogr A. Apr. 10, 2015;1389:128-32.
Garg et al., Interface Electrostatics Dictates the Electron Transport via Bioelectronic Junctions. ACS Appl Mater Interfaces. Dec. 5, 2018;10(48):41599-41607.
Giese et al., Direct observation of hole transfer through DNA by hopping between adenine bases and by tunnelling. Nature. Jul. 19, 2001;412(6844):318-20.
Giese et al., Long distance charge transport through DNA: quantification and extension of the hopping model. Chemphyschem. Dec. 15, 2000;1(4):195-8.
Guo et al., Tuning electronic transport via hepta-alanine peptides junction by tryptophan doping. Proc Natl Acad Sci U S A. Sep. 27, 2016;113(39):10785-90.
Hajian et al., Detection of unamplified target genes via CRISPR-Cas9 immobilized on a graphene field-effect transistor. Nat Biomed Eng. Jun. 2019;3(6):427-437.
Harriman. Further comments on the redox potentials of tryptophan and tyrosine. Journal of Physical Chemistry 1987. 91:6102-6104.
Hays et al., Development of capacitance based immunosensors on mixed self-assembled monolayers. Sensors and Actuators B: Chemical, Apr. 26, 2006, vol. 114, No. 2, pp. 1064-1070.
Hohl et al. Engineering a Polyspecific Pyrrolysyl-tRNA Synthetase by a High Throughput FACS Screen. Sci Rep. Aug. 19, 2019;9(1):11971.
Hozel et al., Trapping Single Molecules by Dielectrophoresis, Physical Review Letters, 2005, 128102-1-4.
Ihalainene et al., Application of paper-supported printed gold eletrodes for impedimetric immunosensor development, Biosensors 2013, 3:1-17.
Jeffrey, An Introduction to Hydrogen Bonding. Oxford University Press New York. 1997. TOC only. 6 pages.
Kluenker et al., Monitoring Thiol-Ligand exchange on Au nanoparticle surfaces. Langmuir. Jan. 30, 2018;34(4):1700-1710.
Kotlowski, Fine discrimination of volatile compounds by graphene-immobilized odorant-binding proteins, Sensors and Actuatores B: Chemical 2018 (256): 564-72.
Krishnan et al., Long-Range Conductivity in Proteins Mediated by Aromatic Residues, ACS Phys. Chem Au 2023, 3:444-455.
Lagunas et al., Long distance electron transfer through the aqueous solution between redox partner proteins. Nat Commun. Dec. 4, 2018;9(1):5157.
Lai et al., Monoclonal antibody produced in plants efficiently treats West Nile virus infection in mice. Proc Natl Acad Sci U S A. Feb. 9, 2010;107(6):2419-24.
Lai et al., Robust production of virus-like particles and monoclonal antibodies with geminiviral replicon vectors in lettuce. Plant Biotechnol J. Jan. 2012;10(1):95-104.
Leary et al., Unambiguous one-molecule conductance measurements under ambient conditions. Nano Lett. Jun. 8, 2011;11(6):2236-41.
Li et al., CRISPR-SE: a brute force search engine for CRISPR design. NAR Genom Bioinform. Feb. 23, 2021;3(1):lqab013.
Li et al., Synthesis and Photovoltaic effect on electron-withdrawing units for low band gap conjugated polymers bearing bi(thienylenevinylene) side chains. Polymers. 2019, vol. 11 iss 9 pp. 1-13.
Lindsay et al., Recognition tunneling, Nanotechnology 2010, 21:262001, 12 pp.
Lindsay. Ubiquitous Electron Transport in Non-Electron Transfer Proteins. Life (Basel). May 20, 2020;10(5):72. 13 pages.
Liu et al., Vertical T cellimmunodomincance and epitope entropy determine HIV-1 escape. J Clin Invest. Jan. 2013; 123(1):380-93.
Maalouf R. et al., Label-Free Detection of Bacteria by Electrochemical Impedance Spectroscopy: Comparison to Surface Plasmon Resonance. Anal. Chem, May 25, 2007, vol. 79, No. 13, pp. 4879-4886.

(56) References Cited

OTHER PUBLICATIONS

Main et al., Design of stable alpha-helical arrays from an idealized TPR motif. Structure. May 2003; 11(5):497-508.
Malvankar et al., Tunable metallic-like conductivity in microbial nanowire networks. Nat Nanotechnol. Aug. 7, 2011;6(9):573-9.
Marakova et al., An updated evolutionary classification of CRISPR-Cas systems. Nat Rev Microbiol. Nov. 2015;13(11):722-36.
Mejias et al., Controlled nanometric fibers of self-assembled designed protein scaffolds. Nanoscale. Oct. 7, 2014;6(19):10982-8.
Metsky et al., Diagnostic design with machine learning model-based optimization. bioRxiv 2020.11.28.401877: 95 pages.
Mullegama et al., Nucleic Acid Extraction from Human Biological Samples. Methods Mol Biol 2019; 1897:359-383.
Nitzan. Chemical dynamics in condensed phases. Oxford University Press., Oxford. 2006. TOC only. 13 pages.
Odella et al., Controlling Proton-Coupled Electron Transfer in Bioinspired Artificial Photosynthetic Relays. J Am Chem Soc. Nov. 14, 2018;140(45):15450-15460.
Olsen et al., Electronic Measurements of Single-Molecule Processing by DNA Polymerase I (Klenow Fragment), Journal of the American Chemical Society (Apr. 30, 2013); pp. 1-12; DOI: 10.1021/ja311603r.
Ouerghi et al., Impedimetric immunosensor using avidin-biotin for antibody immobilization, Bioelectrochemistry, May 15, 2002, 56(1-2): 131-133.
Pang et al. Fixed-Gap Tunnel Junction for Reading DNA Nucleotides, ACS Nano, 2014, 8(12), pp. 11994-12003 (Publication Date (Web): Nov. 7, 2014).
Prodromidis et al., Impedimetric immunosensors—A review, Electrochimica Acta, May 30, 2010, 55(14): 4227-4233.
Quast et al., Cotranslational incorporation of non-standard amino acids using cell-free protein synthesis. FEBS Lett. Jul. 8, 2015;589(15):1703-12.
Ruiz et al., Bioengineering a Single-Protein Junction. J Am Chem Soc. Nov. 1, 2017;139(43):15337-15346.
Sano et al., Cooperative biotin binding by streptavidin. Electrophoretic behavior and subunit association of streptavidin in the presence of 6 M urea. J Biol Chem. Feb. 25, 1990;265(6):3369-73.
Seifert, Characterization of Streptavidin Binding to Biotinylated, Binary Self-Assembled Thio Monolayers-Influence of Component Ratio and Solvent, Langmuir, 2010, 26(9): 6386-93.
Sek et al., Conductance of alpha-helical peptides trapped within molecular junctions. J Phys Chem B. Oct. 5, 2006;110(39):19671-7.
Sela-Culang et al., The strutural basis of antibody-antigen recognition, Frontiers in Immunology, 2013, vol. 4, 13 pages.
Shimura & Yoshida, Heterogeneous photocatalytic hydrogen production from water and biomass derivatives, Energy Environmental Science 2011, 4: 2467.
Smith. The hydrophilic nature of a clean gold surface. J. Colloid Interface Science 1980. 75:51-55.
Staals et al., RNA targeting by the type III-A CRISPR-Cas Csm complex of Thermus thermophilus. Mol Cell. Nov. 20, 2014;56(4):518-30.
Tripkovic et al., Standard hydrogen electrode and potential of zero charge in density functional calculations. Phys. Rev. B 2011. 84:115452.
Tuchband et al., Insulated gold scanning tunneling microscopy probes for recognition tunneling in an aqueous environment. Rev Sci Instrum. Jan. 2012;83(1):015102.
Uygun et al., CRISPR-dCAS9 powered impedimetric biosensor for 1081 label-free detection of circulating tumor DNAs, Analytica Chimica Acta 2020, 1121:35-41.
Varga et al., Binding of a Mouse Monoclonal IgE (anti-DNP) antibody to radio-derivatized polystyrene-DNP complexes, The FASEB Journal, Federation of American Societies for Experimental Biology, Jun. 1, 1990, 4(9): 2678-2683.
Vattay et al., Quantum Criticality at the Origin of Life. Journal of Physics: Conference Series 2015. 626: p. 012023. 11 pages.

Willner et al., Mediated electron transfer in glutathione reductase organized in self-assembled monolayers on Au electrodes. J. Am. Chem. Soc., 1992. 114: p. 10965-10966.
Xiao et al., Conductance titration of single-peptide molecules. J Am Chem Soc. May 5, 2004;126(17):5370-1.
Yang et al., Plant-produced Zika virus envelope protein elicits neutralizing immune responses that correlate with protective immunity against Zika virus in mice. Plant Biotechnol J. Feb. 2018;16(2):572-580.
Yoon, Hidden Markov Models and their Applications in Biological Sequence Analysis, Current Genomics, 2009, 10:402-415.
Zhang et al., Engineering an Enzyme for Direct Electrical Monitoring of Activity. ACS Nano. Feb. 25, 2020;14(2):1360-1368.
Zhang et al., Electronic Decay Length in a Protein Molecule. Nano Lett. Jun. 12, 2019;19(6):4017-4022.
Zhang et al., Observation of Giant Conductance Fluctuations in a Protein. Nano Futures. 2017;1(3):035002. 25 pages.
Zhang et al., Role of contacts in long-range protein conductance. Proc Natl Acad Sci U S A. Mar. 26, 2019;116(13):5886-5891.
Zwolak et al. Electronic Signature of DNA Nucleotides via Transverse Transport, NanoLett., 2005, 5(3), pp. 421-424 (Publication Date (Web): Feb. 12, 2005).
Bayer et al., 3-(N-Maleimido-propionyl) Biocytin: A Versatile Thiol-Specific Biotinylating Reagent, Analytical Biochemistry, 1985, 149: 529-536.
Carter et al., Functional protein materials: beyond elastomeric and structural proteins, Polym. Chem. 2019, 10:2952-2959.
Gerrits et al., Cell-Free Synthesis of Defined Protein Conjugates by Site directed Cotranslational Labeling, NCBI Bookshelf. Jan. 1, 2013, 12 pages, Retrieved from the Internet: URL:https://ww.ncbi.nlm.nih.gov/books/NBK6497.
Zhang et al., Electronic Transport in Molecular Wires of Precisely Controlled Length Built from Modular Proteins, ACS Nano 2022, 16(1): 1671-1680.
Arielly R., et al., Real-Time Detection of Redox Events in Molecular Junctions, Journal of the American Chemical Society, Jan. 27, 2014, vol. 136, No. 6, pp. 2674-2680.
Artes J.M., et al., Conductance Switching in Single Wired Redox Proteins, Small, Jul. 9, 2014, vol. 10, No. 13, pp. 2537-2541, Published Online: Mar. 13, 2014.
Beratan D.N., et al., Charge Transfer in Dynamical Biosytems, or The Treachery of (Static) Images, Accounts of Chemical Research, Feb. 17, 2015, vol. 48, No. 2, pp. 474-481, (Published on: Oct. 13, 2014).
Bertazzon A., et al., Scanning Tunneling Microscopy Imaging of Torpedo Acetylcholine Receptor, Proceedings of the National Academy of Sciences, USA, Oct. 15, 1992, vol. 89, No. 20, pp. 9632-9636.
Bogomolny E., et al., Structure of Wave Functions of Pseudointegrable Billiards, Physical Review Letters, Jun. 18, 2004, vol. 92, No. 24, pp. 244102-1-1244102-4, (Published on: Jun. 16, 2004).
Bogomolny E.B., et al., Models of Intermediate Spectral Statistics, Physical Review E, Feb. 1, 1999, vol. 59, No. 2, pp. R1315-R1318.
Chang S., et al., Palladium Electrodes for Molecular Tunnel Junctions, Nanotechnology, Oct. 4, 2012, vol. 23, No. 42(425202), pp. 1-5, 6 Pages.
Chang S., etaL, Gap Distance and Interactions in a Molecular Tunnel Junction, Journal of American Chemical Society, 2011, vol. 133, No. 36, pp. 14267-14269, (Published on Aug. 12, 2011).
Chen Y-S., et al., A Protein Transistor Made of an Antibody Molecule and Two Gold Nanoparticles, Nature Nanotechnology, Mar. 2012, vol. 7, pp. 197-203 (25 Pages), (Published Online on: Feb. 26, 2012).
Co-Pending U.S. Appl. No. 62/184,776, filed Jun. 25, 2015, 24 Pages.
Dong X., et al., (Alphav)(Beta3) Integrin Crystal Structures and Their Functional Implications, Biochemistry, Oct. 29, 2012, vol. 51, No. 44, pp. 8814-8828.
Engel G.S., et al., Evidence for Wavelike Energy Transfer Through Quantum Coherence in Photosynthetic Systems, Nature, Apr. 12, 2007, vol. 446, No. 7137, pp. 782-786.
Extended European Search Report for European Application No. 21796212.5, mailed May 22, 2024, 08 Pages.

(56) References Cited

OTHER PUBLICATIONS

Fan F-R.F., et al., Electrochemical Detection of Single Molecules, Science, Feb. 10, 1995, vol. 267, No. 5199, pp. 871-874 (5 Pages).
Grden M., et al., Electrochemical Behaviour of Palladium Electrode: Oxidation, Electrodissolution and Ionic Adsorption, Electrochimica Acta, Nov. 1, 2008, vol. 53, No. 26, pp. 7583-7806, 16 Pages.
Haiss W., et al., Thermal Gating of the Single Molecule Conductance of Alkanedithiols, Faraday Discussions, 2006, vol. 131, pp. 253-264, (Published on Oct. 4, 2005).
Hoffman R., et al., An Extended Huckel Theory I. Hydrocarbons, The Journal of Chemical Physics, Sep. 15, 1963, vol. 39, No. 6, pp. 1397-1412 (17 Pages).
Im J.O., et al., Electronic Single-molecule Identification of Carbohydrate Isomers by Recognition Tunnelling, Nature Communications, Dec. 21, 2016, vol. 7, Article 13868, pp. 1-7.
Kang Y., et al., "DC-Dielectrophoretic Separation of Biological Cells by Size", Biomedical Microdevices, vol. 10, pp. 243-249, 2008, pp. 243-249.
Karachaliou C-E., et al., IgY Technology: Methods for Developing and Evaluating Avian Immunoglobulins for the in Vitro Detection of Biomolecules, World Journal of Methodology, Sep. 20, 2021, vol. 11, No. 5, pp. 243-262 (24 Pages).
Kumar K.S., et al., Long-range Tunneling Processes Across Ferritin-based Junctions, Advanced Materials, Mar. 2, 2016, vol. 28, No. 9, pp. 1824-1830, (Dec. 28, 2015).
Leatherbarrow R.J., et al., Structure of Immunoglobulin G by Scanning Tunnelling Microscopy, Journal of Molecular Biology, Sep. 20, 1991, vol. 221, No. 2, pp. 361-365.
Lloyd S., Quantum Coherence in Biological Systems, Journal of Physics: Conference Series, 2011, vol. 302, No. 012037, pp. 1-5 (6 Pages).
Lucie S., et al., Clustering and Internalization of Integrin (Alphav)(Beta3) With a Tetrameric RGD-synthetic Peptide, Molecular Therapy, May 2009, vol. 17, No. 5, pp. 837-843, (Published Online on Mar. 3, 2009).
Luo B-H., et al., Structural Basis of Integrin Regulation and Signaling, Annual Review of Immunology, 2007, vol. 25, pp. 619-647 (32 Pages), (Jan. 2, 2007).
Miodek A., et al., Streptavidin-Polypyrrole Film as Platform for Biotinylated Redox Probe Immobilization for Electrochemical Immunosensor Application, Electroanalysis, 2016, vol. 28, No. 8, pp. 1824-1832, (Published Online on May 27, 2016).
Nature: Protein Structure Nature Education at the Scitable by Nature Education, 2014, 4 Pages, [Retrieved on Oct. 15, 2024] Retrieved from URL: https://www.nature.com/scitable/topicpage/protein-structure-14122136/.
Non-Final Office Action for U.S. Appl. No. 15/375,901, mailed Dec. 10, 2018, 30 Pages.
Notice of Allowance for U.S. Appl. No. 15/375,901, mailed Mar. 29, 2019, 11 Pages.
O'Boyle N.M., et al., Open Babel: An Open Chemical Toolbox, Journal of Cheminformatics, Oct. 7, 2011, vol. 3, No. 33, pp. 1-14.
Onuchic J.N., et al., Pathway Analysis of Protein Electron-Transfer Reactions, Annual Review of Biophysics and Biomolecular Structure, 1992, vol. 21, pp. 349-377 (31 Pages).
Palecek E., et al., Electrochemistry of Nonconjugated Proteins and Glycoproteins. Toward Sensors for Biomedicine and Glycomics, Chemical Reviews, 2015, vol. 115, No. 5, pp. 2045-2108, (Published on Feb. 9, 2015).
Pang P., et al., Fixed-gap Tunnel Junction for Reading DNA Nucleotides, ACS Nano, Nov. 7, 2014, vol. 8, No. 12, pp. 11994-12003 (20 Pages), (Including Supporting Material).
Partial European Search Report for European Application No. 23188136.8, mailed Nov. 30, 2023, 18 Pages.
Partial Supplementary European Search Report for European Application No. 20749683.7, mailed Oct. 7, 2022, 20 Pages.
Polizzi N.F., et al., Physical Constraints on Charge Transport Through Bacterial Nanowires, Faraday Discussions, 2012, vol. 155, pp. 43-62, (Published on Oct. 17, 2011).
Roxin A., et al., Flexible or Fixed: A Comparative Review of Linear and Cyclic Cancer-Targeting Peptides, Future Medicinal Chemistry, Aug. 2012, vol. 4, No. 12, pp. 1601-1618.
Sequences of amino acids as found on the world wide web at bmrb.wisc.edu/referenc/choufas. 4 pages.
Shang L., et al., "Electrical Characterization of Nanowire Bridges Incorporating Biomolecular Recognition Elements", Nanotechnology, vol. 16, 2005, pp. 2846-2851.
Simmons J.G., Generalized Formula for the Electric Tunnel Effect Between Similar Electrodes Separated by a Thin Insulating Film, Journal of Applied Physics, Jun. 1963, vol. 34, No. 6, pp. 1793-1803 (12 Pages).
Stuchebrukhov A.A., Toward AB Initio Theory of Long-Distance Electron Tunneling in Proteins: Tunneling Currents Approach, Advances in Chemical Physics, Jan. 1, 2001, vol. 118, pp. 1-44.
Thomson N.H., et al., Molecular Images of Cereal Proteins by STM, Ultramicroscopy, Jul. 1992, vol. 42-44, (Part B), pp. 1204-1213.
Xiong J-P., et al., Crystal Structure of the Extracellular Segment of Integrin (Alpha)v(Beta)3 in Complex With an Arg-gly-asp Ligand, Science, Apr. 5, 2002, vol. 296, No. 5565, pp. 151-155 (6 Pages), (Published Online on Mar. 7, 2002).
Zhang B., et al., "Engineering an Enzyme for Direct Electrical Monitoring of Activity", ACS NANO, vol. 14, No. 2, Oct. 2019, 1360-1368, 14 Pages, XP055736319, US ISSN: 1936-0851, DOI: 10.1021/acsnano.9b06875.
Zhang B., et al., Observation of Giant Conductance Fluctuations in a Protein, Nano Futures, 2017, vol. 1, pp. 1-15.
Zhang Y., et al., Biological Charge Transfer via Flickering Resonance, Proceedings of the National Academy of Sciences, USA, Jul. 15, 2014, vol. 111, No. 28, pp. 10049-10054, (Published Online: Jun. 25, 2014).

* cited by examiner

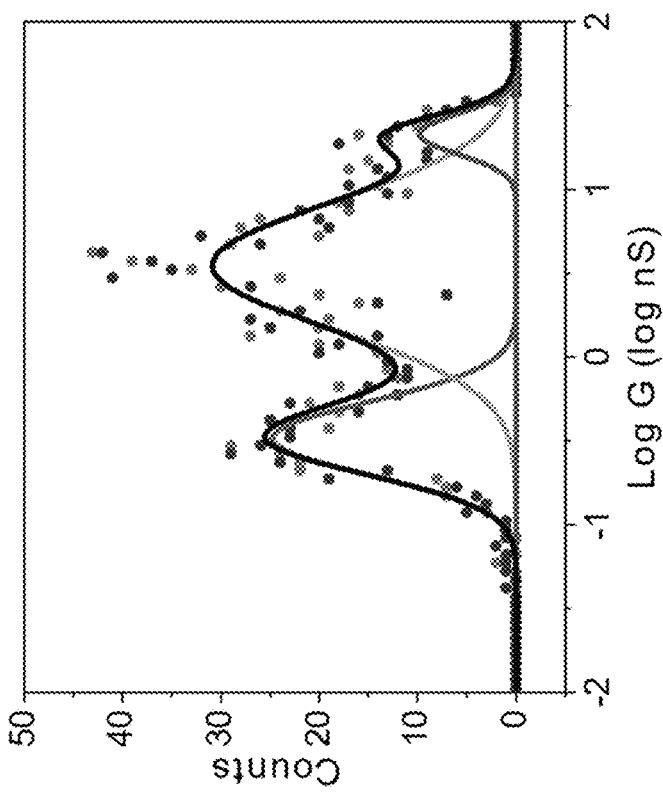
FIG. 5A
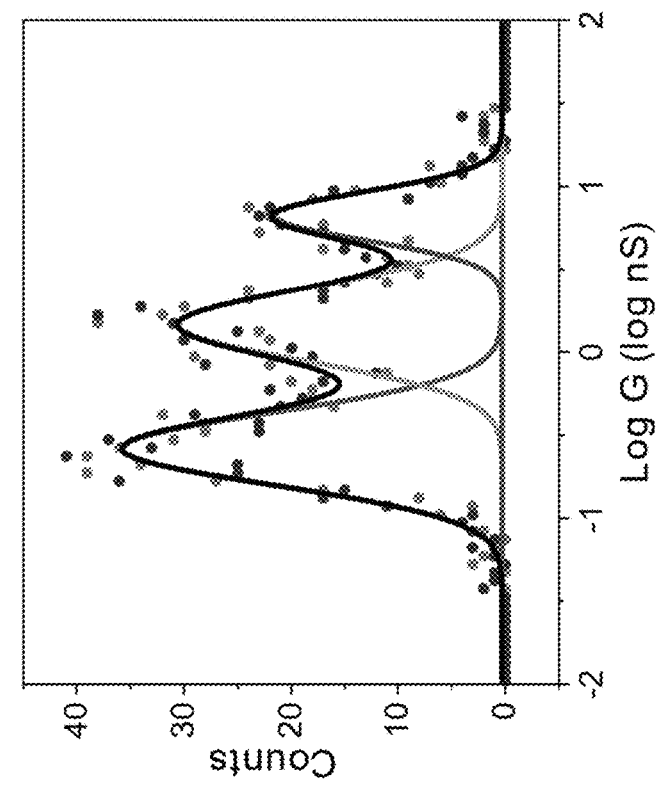
FIG. 5B
FIGS. 5A-5B

METHODS FOR SEQUENCING BIOPOLYMERS

RELATED APPLICATIONS

This application claims priority to and the benefit of U.S. Provisional Patent Application No. 63/018,352 filed Apr. 30, 2020, which is incorporated herein by reference in its entirety for all purposes.

GOVERNMENT SUPPORT

This invention was made with government support under R21 HG010522 awarded by the National Institutes of Health. The government has certain rights in the invention.

FIELD

The present disclosure provides devices, systems, and methods related to sequencing a biopolymer. In particular, the present disclosure relates to methods for sequencing a polynucleotide using a bioelectronic device that obtains a bioelectronic signature of polymerase activity based on current fluctuations as complementary nucleotidepolyphosphate monomers having distinctive charges are incorporated into the template polynucleotide.

BACKGROUND

As proteins perform their various functions, movements are generated that underlie these functions. The ability to develop devices, systems, and methods that measure the electrical characteristics corresponding to the fluctuations generated by an active protein can be a basis for label-free detection and analysis of protein function. For example, monitoring the functional fluctuations of an active enzyme may provide a rapid and simple method of screening candidate drug molecules that affect the enzyme's function. In other cases, the ability to monitor the fluctuations of proteins that process biopolymers (e.g., carbohydrates, polypeptides, nucleic acids, and the like) may reveal new information about their conformational changes and how those changes are linked to function. Additionally, diagnostic and analytical devices can be developed to take advantage of the electrical characteristics produced by active proteins, providing new ways to leverage biomechanical properties for practical use.

SUMMARY

Embodiments of the present disclosure include a method for sequencing a polynucleotide using a bioelectronic device. In accordance with these embodiments, the method includes introducing a template polynucleotide to a bioelectronic device. In some embodiments, the bioelectronic device comprises a polymerase functionally coupled to at least one of a first electrode and a second electrode. In some embodiments, the method further includes introducing a solution comprising four nucleotidepolyphosphate monomers to the device comprising the template polynucleotide. In some embodiments, at least three of the four nucleotidepolyphosphate monomers present in the solution comprises a distinctive charge relative to its corresponding standard nucleotidetriphosphate monomer. In some embodiments, the method further includes obtaining a bioelectronic signature of polymerase activity based on current fluctuations as each complementary nucleotidepolyphosphate monomer is incorporated into the template polynucleotide. In some embodiments, at least one characteristic of the bioelectronic signature identifies each of the complementary nucleotidepolyphosphate monomers incorporated into the template polynucleotide.

In some embodiments, the bioelectronic signature comprises a closed period corresponding to the polymerase being in a closed state.

In some embodiments, the at least one characteristic of the bioelectronic signature comprises current amplitude level.

In some embodiments, at least one of the nucleotidepolyphosphate monomers present in the solution comprises a distinctive negative charge relative to its corresponding standard nucleotidetriphosphate monomer. In some embodiments, at least two of the nucleotidepolyphosphate monomers present in the solution comprise distinctive negative charges relative to their corresponding standard nucleotidetriphosphate monomer. In some embodiments, at least three of the nucleotidepolyphosphate monomers present in the solution comprise distinctive negative charges relative to their corresponding standard nucleotidetriphosphate monomer. In some embodiments, the negative charge is conferred by at least one additional phosphate group relative to its corresponding standard nucleotidetriphosphate monomer. In some embodiments, the negative charge is conferred by 1 to 20 additional phosphate groups. In some embodiments, a distinctive negative charge on the at least one nucleotidepolyphosphate monomer corresponds to an increased or decreased current amplitude level relative to the current amplitude level of its corresponding standard nucleotidetriphosphate monomer.

In some embodiments, at least one of the nucleotidepolyphosphate monomers present in the solution comprises a distinctive positive charge relative to its corresponding standard nucleotidetriphosphate monomer. In some embodiments, at least two of the nucleotidepolyphosphate monomers present in the solution comprises a distinctive positive charge relative to its corresponding standard nucleotidetriphosphate monomer. In some embodiments, at least three of the nucleotidepolyphosphate monomers present in the solution comprises a distinctive positive charge relative to its corresponding standard nucleotidetriphosphate monomer. In some embodiments, a distinctive positive charge on the at least one nucleotidepolyphosphate monomer corresponds to an increased or decreased current amplitude level relative to the current amplitude level of its corresponding standard nucleotidetriphosphate monomer.

In some embodiments, the exonuclease activity of the polymerase is disabled.

In some embodiments, the polymerase is functionally coupled to the first and second electrodes using a linker comprising streptavidin.

In some embodiments, linker is attached to a region of the polymerase that is inactive.

In some embodiments, the method includes applying a voltage bias between the first and second electrodes that is 100 mV or less.

In some embodiments, the standard nucleotidetriphosphate monomers include adenine (dATP), cytosine (dCTP), guanine (dGTP), and thymine (dTTP).

In some embodiments, the first and/or the second electrode comprises gold, palladium, platinum, silver, copper, or any alloys thereof.

In some embodiments, the device comprises a dielectric layer at least partially covering a top surface of the first and/or second electrode.

In some embodiments, the first electrode and second electrode are positioned so that about a 1 nm to about a 50 nm gap is formed between the two electrodes.

Embodiments of the present disclosure also include a bioelectronic device that includes a first electrode and a second electrode separated by a gap, and a protein attached to the first and second electrodes via a linker comprising a distinctive electrical charge. In some embodiments, the distinctive electrical charge modulates conductance through the protein.

In some embodiments, the linker comprises a peptide or polypeptide. In some embodiments, the linker comprises streptavidin. In some embodiments, the protein is biotinylated.

In some embodiments, the linker comprises a distinctive negative charge. In some embodiments, the distinctive negative charge is conferred by addition of a glutamate moiety, an aspartate moiety, or a combination thereof, coupled to the streptavidin. In some embodiments, the distinctive negative charge increases the conductance through the protein.

In some embodiments, the linker comprises a distinctive positive charge. In some embodiments, the distinctive positive charge is conferred by addition of an arginine moiety, a histidine moiety, a lysine moiety, or a combination thereof, coupled to the streptavidin. In some embodiments, the distinctive positive charge increases or decreases the conductance through the protein.

In some embodiments, the first and/or the second electrode comprises gold, palladium, platinum, silver, copper, or any alloys thereof.

In some embodiments, the protein is selected from the group consisting of a polymerase, a nuclease, a proteasome, a glycopeptidase, a glycosidase, a kinase and an endonuclease.

In some embodiments, the linker is attached to an inactive region of the protein.

In some embodiments, the linker comprises streptavidin coupled to a polyglutamate moiety, the protein comprises a polymerase, and the first and second electrodes comprise palladium, platinum, or any alloys thereof.

Embodiments of the present disclosure also include a method of modulating electronic conductance through a protein using any of the bioelectronic devices described herein.

BRIEF DESCRIPTION OF THE DRAWINGS

FIG. 3A demonstrates that the time duration of the various features depends upon the nucleotide being incorporated, but the amplitude of the current does not. FIG. 3B demonstrates that different amounts of charge carried by each of the four nucleotides results in different current levels in the closed state of the polymerase. The sequence readout is shown above the trace.

FIGS. 5A-5B: Representative conductance distributions for wildtype (FIG. 5A) and the hexagluamate mutant streptavidin (FIG. 5B) measured at a 2.5 nm gap using Pd electrodes.

DETAILED DESCRIPTION

Figure 1:
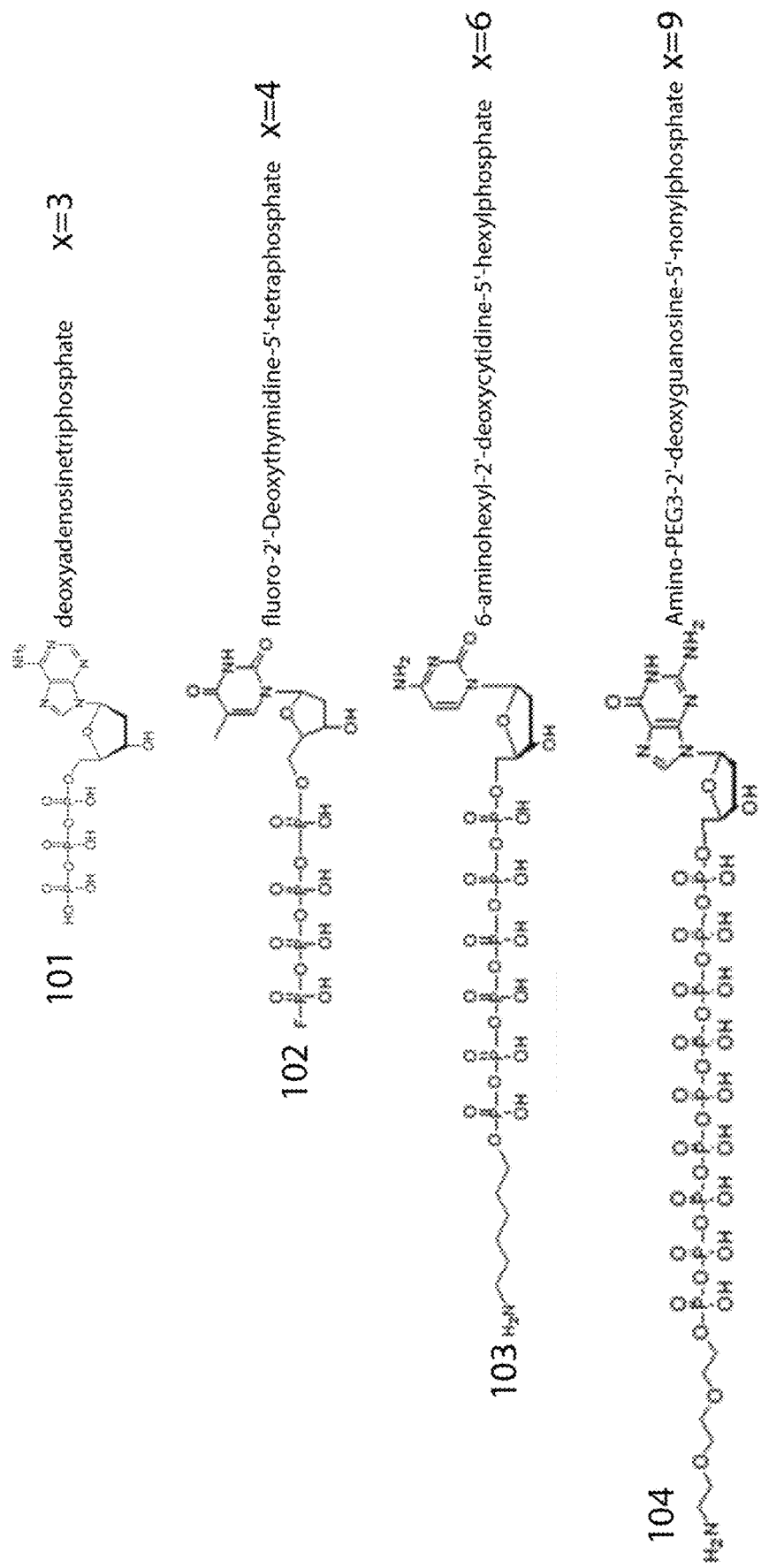
FIG. 1: Representations of examples of deoxynucleotide-polyphosphates in which varying numbers of phosphates contribute different amounts of charge to each deoxynucleotidepolyphosphate.

In the following detailed description, reference is made to the accompanying drawings that form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

Unless otherwise noted, technical terms are used according to conventional usage. Definitions of common terms in molecular biology can be found in Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); and Robert A. Meyers (ed.), Molecular Biology and Biotechnology: a Comprehensive Desk Reference, published by VCH Publishers, Inc., 1995 (ISBN 9780471185710); and other similar references.

Suitable methods and materials for the practice or testing of this disclosure are described below. Such methods and materials are illustrative only and are not intended to be limiting. Other methods and materials similar or equivalent to those described herein can be used. For example, conventional methods well known in the art to which this disclosure pertains are described in various general and more specific references, including, for example, Sambrook et al., *Molecular Cloning: A Laboratory Manual,* 2d ed., Cold Spring Harbor Laboratory Press, 1989; Sambrook et al., *Molecular Cloning: A Laboratory Manual,* 3d ed., Cold Spring Harbor Press, 2001; Ausubel et al., *Current Protocols in Molecular Biology,* Greene Publishing Associates, 1992 (and Supplements to 2000); Ausubel et al., *Short Protocols in Molecular Biology: A Compendium of Methods from Current Protocols in Molecular Biology,* 4th ed., Wiley & Sons, 1999; Harlow and Lane, *Antibodies: A Laboratory Manual,* Cold Spring Harbor Laboratory Press, 1990; and Harlow and Lane, *Using Antibodies: A Laboratory Manual,* Cold Spring Harbor Laboratory Press, 1999. In addition, the materials, methods, and examples are illustrative only and not intended to be limiting.

Section headings as used in this section and the entire disclosure herein are merely for organizational purposes and are not intended to be limiting.

1. Definitions

To facilitate review of the various embodiments of the disclosure, the following explanations of specific terms are provided below. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein, "biological sample" generally refers to a biological specimen containing genomic DNA, RNA (such as mRNA), protein, or combinations thereof, obtained from a subject. Examples include, but are not limited to, saliva, peripheral blood, urine, tissue biopsy, surgical specimen, and autopsy material. In embodiments, the biological sample is a bodily fluid, such as blood, or a component thereof, such as plasma or serum.

As used herein, "biopolymer" generally refers to polymers (e.g., produced by living organisms or synthetically generated). Biopolymers contain monomeric units that are covalently bonded to form larger structures. There are three main classes of biopolymers, classified according to the monomeric units used and the structure of the biopolymer formed: polynucleotides (RNA and DNA), which are long polymers composed of 13 or more nucleotide monomers; polypeptides, which are short polymers of amino acids; and polysaccharides, which are often linear bonded polymeric carbohydrate structures. Other examples of biopolymers include rubber, suberin, melanin and lignin.

As used herein, an "isolated" biological component (e.g., such as a nucleic acid molecule, protein, or cell) has been substantially separated or purified away from other biological components in the cell of the organism, or the organism itself, in which the component naturally occurs, such as other chromosomal and extra-chromosomal DNA and RNA, proteins and cells. Nucleic acid molecules and proteins that have been "isolated" may be understood to have been purified by standard purification methods. The term also embraces nucleic acid molecules and proteins prepared by recombinant expression in a host cell as well as chemically synthesized nucleic acid molecules and proteins.

As used herein, "burst" generally refers to a section of a current stream in which the measured current changes between two levels more frequently relative to a pause, typically being in the high state for half the time of a pause. The measured current of the peaks in a burst is greater than about 20% of the baseline current passing through the molecule. Typically, a burst is observed when a nucleotide is being incorporated into a template sequence.

As used herein, "modification," "chemical modification," or "chemically modified" generally refers to any of a number of various processes involving the alteration of the chemical constituent or structure of molecules. For example, a polymerase can be chemically modified to form a chemical bond with a first electrode and a second electrode. In one example, a chemically-modified electrode is an electrode that has a surface chemically converted to change the electrode's properties, such as its physical, chemical, electrochemical, optical, electrical, and/or transport characteristics. As provided herein, the chemical modification can also involve chemically altering a polymerase so that it is compatible with a linker that binds to an electrode (e.g., biotin/streptavidin, HaloTag, and the like). In other embodiments, a modification can be generated via protein synthesis. For example, a polymerase can be designed to comprise one or more modifications (e.g., a linker) when synthesized from a polynucleotide that encodes the protein and the modification (e.g. linker).

As used herein, "contact" and "contacting" can include placement in direct physical association, including both a solid and liquid form. "Contacting" can include a specific chemical contact between two different substances (e.g., covalent bond, or non-covalent bond having specific ligand interaction with specific amino acid residues).

As used herein, "complementarity" or "complementary" generally refers to the ability of a nucleic acid to form hydrogen bond(s) with another nucleic acid sequence by either traditional Watson-Crick base pairing or other non-traditional types. A percent complementarity indicates the percentage of residues in a nucleic acid molecule which can form hydrogen bonds (e.g., Watson-Crick base pairing) with a second nucleic acid sequence (e.g., 5, 6, 7, 8, 9, 10 out of 10 being 50%, 60%, 70%, 80%, 90%, and 100% complementary). "Perfectly complementary" generally indicates that all the contiguous residues of a nucleic acid sequence will hydrogen bond with the same number of contiguous residues in a second nucleic acid sequence. "Substantially complementary" as used herein refers to a degree of complementarity that is at least 60%, 65%, 70%, 75%, 80%, 85%, 90%, 95%, 97%, 98%, 99%, or 100% over a region of 8, 9, 10, 11, 12, 13, 14, 15, 16, 17, 18, 19, 20, 21, 22, 23, 24, 25, 30, 35, 40, 45, 50, or more nucleotides, or refers to two nucleic acids that hybridize under stringent conditions.

As used herein, "current stream" generally refers to a current signal generated over time, such as from the bioelectronic devices of the present disclosure.

As used herein, a "label" generally refers to an agent capable of detection, for example by ELISA, spectrophotometry, flow cytometry, or microscopy. For example, a label can be attached to a nucleic acid molecule or protein (indirectly or directly), thereby permitting detection of the nucleic acid molecule or protein. Examples of labels include, but are not limited to, radioactive isotopes, enzyme substrates, co-factors, ligands, chemiluminescent agents, fluorophores, haptens, enzymes, and combinations thereof. Methods for labeling and guidance in the choice of labels appropriate for various purposes are discussed for example in Sambrook et al. (Molecular Cloning: A Laboratory Manual, Cold Spring Harbor, New York, 1989) and Ausubel et al. (In Current Protocols in Molecular Biology, John Wiley & Sons, New York, 1998).

As used herein, the term "linker" or "linked" means joined together, either directly or indirectly. For example, a first moiety may be covalently or noncovalently (e.g., electrostatically) linked to a second moiety. This includes, but is not limited to, covalently bonding one molecule to another molecule, noncovalently bonding one molecule to another (e.g., electrostatically bonding), non-covalently bonding one molecule to another molecule by hydrogen bonding, non-covalently bonding one molecule to another molecule by van der Waals forces, and any and all combinations of such couplings. Indirect attachment is possible, such as by using a "linker" (a molecule or group of atoms positioned between two moieties). In several embodiments, linked components are associated in a chemical or physical manner so that the components are not freely dispersible from one another. For example, two components may be covalently bound to one another so that the two components are incapable of separately dispersing or diffusing. In several embodiments, linked components are associated in a chemical or physical manner so that the components are not freely dispersible from one another. For example, two components may be covalently bound to one another so that the two components are incapable of separately dispersing or diffusing.

As used herein, the terms "non-naturally occurring" and "engineered" interchangeably indicate the involvement of the hand of man. These terms, when referring to nucleic acid molecules or polypeptides, generally indicate that the nucleic acid molecule or the polypeptide is at least substantially free from at least one other component with which they are naturally associated in nature and as found in nature.

As used herein, "nucleic acid" generally refers to a deoxyribonucleotide or ribonucleotide polymer, which can include analogues of natural nucleotides that hybridize to nucleic acid molecules in a manner similar to naturally occurring nucleotides. In one example, a nucleic acid molecule is a single stranded (ss) DNA or RNA molecule, such as a probe or primer. In another example, a nucleic acid molecule is a double stranded (ds) nucleic acid. In another example, a nucleic acid is a modified DNA or RNA molecule, such as a xenonucleic acid (XNA). The term "nucleotide" generally refers to a base-sugar-phosphate combination and includes ribonucleoside triphosphates ATP, UTP, CTG, GTP and deoxyribonucleoside triphosphates such as dATP, dCTP, dITP, dUTP, dGTP, dTTP, or derivatives thereof. As described further herein, a nucleic acid can include deoxynucleotidepolyphosphate monomers (dNxPs), such as those having altered charges as compared to their corresponding standard deoxynucleotidetriphosphate monomers.

As used herein, "polypeptide," "peptide," and "protein" generally refer to a polymer in which the monomers are amino acid residues that are joined together through amide bonds. When the amino acids are alpha-amino acids, either the L-optical isomer or the D-optical isomer can be used, the L-isomers being preferred in nature. The term polypeptide is specifically intended to cover naturally occurring proteins, as well as those that are recombinantly or synthetically produced. A substantially purified polypeptide as used herein refers to a polypeptide that is substantially free of other proteins, lipids, carbohydrates or other materials with which it is naturally associated. In one embodiment, the polypeptide is at least 50%, for example at least 80% free of other proteins, lipids, carbohydrates or other materials with which it is naturally associated. In another embodiment, the polypeptide is at least 90% free of other proteins, lipids, carbohydrates or other materials with which it is naturally associated. In yet another embodiment, the polypeptide is at least 95% free of other proteins, lipids, carbohydrates or other materials with which it is naturally associated.

Conservative amino acid substitution tables providing functionally similar amino acids are well known to one of ordinary skill in the art. The following six groups are examples of amino acids that are considered to be conservative substitutions for one another: 1) Alanine (A), Serine (S), Threonine (T); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); and 6) Phenylalanine (F), Tyrosine (Y), Tryptophan (W).

A non-conservative amino acid substitution can result from changes in: (a) the structure of the amino acid backbone in the area of the substitution; (b) the charge or hydrophobicity of the amino acid; or (c) the bulk of an amino acid side chain. Substitutions generally expected to produce the greatest changes in protein properties are those in which: (a) a hydrophilic residue is substituted for (or by) a hydrophobic residue; (b) a proline is substituted for (or by) any other residue; (c) a residue having a bulky side chain, e.g., phenylalanine, is substituted for (or by) one not having a side chain, e.g., glycine; or (d) a residue having an electropositive side chain, e.g., lysyl, arginyl, or histadyl, is substituted for (or by) an electronegative residue, e.g., glutamyl or aspartyl. Variant amino acid sequences may, for example, be 80, 90 or even 95 or 98% identical to the native amino acid sequence. Programs and algorithms for determining percentage identity can be found at the NCBI website.

As used herein, "probe" generally refers to a short sequence of nucleotides, such as at least 8, at least 10, at least 15, at least 20, or at least 21 nucleotides in length, which can be used to detect the presence of a complementary sequence by molecular hybridization. In particular examples, oligonucleotide probes include a label that permits detection of oligonucleotide probe:target sequence hybridization complexes. Laboratory standards and values can be set based on a known or determined population value and can be supplied in the format of a graph or table that permits comparison of measured, experimentally determined values.

As used herein, "primer" generally refers to a short nucleic acid molecule, for instance DNA oligonucleotides 10-100 nucleotides in length, such as 5, 6, 7, 8, 9, 10, 11, 12, or more in length. Primers can be annealed to a complementary target nucleic acid strand by nucleic acid hybridization to form a hybrid between the primer and the target nucleic acid strand. Primers can be used for amplification of a nucleic acid sequence, such as by PCR or other nucleic acid amplification methods known in the art.

As used herein, the term "purified" does not require absolute purity; rather, it is intended as a relative term. Thus, for example, a purified protein preparation is one in which the protein referred to is more pure than the protein in its natural environment within a cell. For example, a preparation of a protein is purified such that the protein represents at least 50% of the total protein content of the preparation. Similarly, a purified oligonucleotide preparation is one in which the oligonucleotide is purer than in an environment including a complex mixture of oligonucleotides. Purity of a compound may be determined, for example, by high performance liquid chromatography (HPLC) or other conventional methods.

As used herein, "recombinant" generally refers to recombinant nucleic acid or protein that has a sequence that is not naturally occurring or has a sequence that is made by an artificial combination of two otherwise separated segments of sequence. This artificial combination is often accomplished by chemical synthesis or by the artificial manipulation of isolated segments of nucleic acids, for example, by genetic engineering techniques. The term recombinant includes nucleic acids and proteins that have been altered solely by addition, substitution, or deletion of a portion of a natural nucleic acid molecule or protein.

As used herein, the term "subject" includes human and non-human animals. "Patient" and "subject" are used interchangeably herein.

As used herein, the terms, "substantial identity" or "substantially identical" generally refer to a nucleic acid or fragment thereof, that, when optimally aligned with appropriate nucleotide insertions or deletions with another nucleic acid (or its complementary strand), refers to a nucleotide sequence having at least about 95% sequence identity, as measured by any well-known algorithm of sequence identity, such as FASTA, BLAST or Gap, as discussed below. A nucleic acid molecule having substantial identity to a reference nucleic acid molecule may, in certain instances, encode a polypeptide having the same or substantially similar amino acid sequence as the polypeptide encoded by the reference nucleic acid molecule.

As applied to polypeptides, the term "substantial similarity" or "substantially similar" means that two peptide sequences, when optimally aligned, such as by the programs GAP or BESTFIT using default gap weights, share at least 95% sequence identity, even more preferably at least 98% or 99% sequence identity. Preferably, residue positions which are not identical differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of similarity may be adjusted upwards to correct for the conservative nature of the substitution. Means for making this adjustment are well-known to those of skill in the art. See, e.g., Pearson (1994) Methods Mol. Biol. 24: 307-331, herein incorporated by reference. Examples of groups of amino acids that have side chains with similar chemical properties include (1) aliphatic side chains: glycine, alanine, valine, leucine and isoleucine; (2) aliphatic-hydroxyl side chains: serine and threonine; (3) amide-containing side chains: asparagine and glutamine; (4) aromatic side chains: phenylalanine, tyrosine, and tryptophan; (5) basic side chains: lysine, arginine, and histidine; (6) acidic side chains: aspartate and glutamate, and (7) sulfur-containing side chains are cysteine and methionine. Preferred conservative amino acids substitution groups are: valine-leucine-isoleucine, phenylalanine-tyrosine, lysine-arginine, alanine-valine, glutamate-aspartate, and asparagine-glutamine. Alternatively, a conservative replacement is any change having a positive value in the PAM250 log-likelihood matrix disclosed in Gonnet et al. (1992) Science 256: 1443-1445, herein incorporated by reference. A "moderately conservative" replacement is any change having a nonnegative value in the PAM250 log-likelihood matrix.

Sequence similarity for polypeptides, which is also referred to as sequence identity, is typically measured using sequence analysis software. Protein analysis software matches similar sequences using measures of similarity assigned to various substitutions, deletions and other modifications, including conservative amino acid substitutions. For instance, GCG software contains programs such as Gap and Bestfit which can be used with default parameters to determine sequence homology or sequence identity between closely related polypeptides, such as homologous polypeptides from different species of organisms or between a wild type protein and a mutant thereof. See, e.g., GCG Version 6.1. Polypeptide sequences also can be compared using FASTA using default or recommended parameters, a program in GCG Version 6.1. FASTA (e.g., FASTA2 and FASTA3) provides alignments and percent sequence identity of the regions of the best overlap between the query and search sequences (Pearson (2000) supra). Another preferred algorithm when comparing a sequence of the invention to a database containing a large number of sequences from different organisms is the computer program BLAST, especially BLASTP or TBLASTN, using default parameters. See, e.g., Altschul et al. (1990) J. Mol. Biol. 215:403-410 and Altschul et al. (1997) Nucleic Acids Res. 25:3389-402, each herein incorporated by reference.

As used herein, "variant" generally refers to a peptide or polypeptide that differs in amino acid sequence by the insertion, deletion, or conservative substitution of amino acids, but retain at least one biological activity. "SNP" refers to a variant that is a single nucleotide polymorphism. Representative examples of "biological activity" include the ability to be bound by a specific antibody or to promote an immune response. Variant is also used herein to describe a protein with an amino acid sequence that is substantially identical to a referenced protein with an amino acid sequence that retains at least one biological activity. A conservative substitution of an amino acid, i.e. replacing an amino acid with a different amino acid of similar properties (e.g., hydrophilicity, degree, and distribution of charged regions) is recognized in the art as typically involving a minor change. These minor changes can be identified, in part, by considering the hydropathic index of amino acids, as understood in the art. Kyte et al., *J Mol. Biol.* 157:105-132 (1982). The hydropathic index of an amino acid is based on a consideration of its hydrophobicity and charge. It is known in the art that amino acids of similar hydropathic indexes can be substituted and still retain protein function. In one aspect, amino acids having hydropathic indexes of ±2 are substituted. The hydrophilicity of amino acids can also be used to reveal substitutions that would result in proteins retaining biological function. A consideration of the hydrophilicity of amino acids in the context of a peptide permits calculation of the greatest local average hydrophilicity of that peptide, a useful measure that has been reported to correlate well with antigenicity and immunogenicity. Substitution of amino acids having similar hydrophilicity values can result in peptides retaining biological activity, for example immunogenicity, as is understood in the art. Substitutions may be performed with amino acids having hydrophilicity values within ±2 of each other. Both the hydrophobicity index and the hydrophilicity value of amino acids are influenced by the particular side chain of that amino acid. Consistent with that observation, amino acid substitutions that are compatible with biological function are understood to depend on the relative similarity of the amino acids, and particularly the side chains of those amino acids, as revealed by the hydrophobicity, hydrophilicity, charge, size, and other properties.

As used herein, "pause" generally refers to a section of a current stream in which the fluctuations in measured current are interrupted by a slower feature of about twice the duration of the neighboring features. Typically, a pause is observed before and after a nucleotide has been incorporated into a template sequence, and the duration of the pause relative to the neighboring pulses of current increases as the concentration of nucleotide triphosphates is lowered.

As used herein, a "polymerase" generally refers to an enzyme that synthesizes long chains of polymers or nucleic acids. DNA polymerase and RNA polymerase are used to assemble DNA and RNA molecules, respectively, by copying a DNA template strand using base-pairing interactions or RNA by half ladder replication.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As noted herein, the disclosed embodiments have been presented for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, compositions, systems and apparatuses/devices which may further include any and all elements from any other disclosed methods, compositions, systems, and devices, including any and all elements corresponding to detecting protein activity. In other words, elements from one or another disclosed embodiments may be interchangeable with elements from other disclosed embodiments. Moreover, some further embodiments may be realized by combining one and/or another feature disclosed herein with methods, compositions, systems and devices, and one or more features thereof, disclosed in materials incorporated by reference. In addition, one or more features/elements of disclosed embodiments may be removed and still result in patentable subject matter (and thus, resulting in yet more embodiments of the subject disclosure). Furthermore, some embodiments correspond to methods, compositions, systems, and devices which specifically lack one and/or another element, structure, and/or steps (as applicable), as compared to teachings of the prior art, and therefore represent patentable subject matter and are distinguishable therefrom (i.e. claims directed to such embodiments may contain negative limitations to note the lack of one or more features prior art teachings).

2. Methods for Sequencing a Biopolymer

Embodiments of the present disclosure include devices, systems, and methods related to sequencing a biopolymer. In particular, the present disclosure relates to methods for sequencing a polynucleotide using a bioelectronic device that obtains a bioelectronic signature (e.g., current amplitude levels) of polymerase activity based on current fluctuations as complementary nucleotidepolyphosphate monomers (e.g., having distinctive charges) are incorporated into the template polynucleotide.

As described further herein, the devices, systems, and methods of the present disclosure can be used to generate a bioelectronic signature of an enzyme-of-interest, which can be used to determine the sequence of any biopolymer (e.g., polynucleotide). In some embodiments, the enzyme-of-interest can be a polymerase, and various aspects of a bioelectronic signature of a polymerase as it adds nucleotide monomers to a template polynucleotide strand can be used to determine the sequence of that template polynucleotide. For example, a bioelectronic signature of polymerase activity can be based on current fluctuations as each complementary nucleotide monomer is incorporated into the template polynucleotide. In some embodiments, a bioelectronic signature is generated based on current amplitude levels corresponding to polymerase activity as complementary nucleotidepolyphosphate monomers having distinctive charges are incorporated into a template polynucleotide. In some embodiments, the bioelectronic device used to generate a bioelectronic signature comprises a polymerase functionally coupled to both a first electrode and a second electrode. The term "nucleotide" generally refers to a base-sugar-phosphate combination and includes ribonucleoside triphosphates ATP, UTP, CTG, GTP and deoxyribonucleoside triphosphates such as dATP, dCTP, dITP, dUTP, dGTP, dTTP, or derivatives thereof.

In some embodiments, methods for sequencing a biopolymer include identifying a nucleotide base incorporated into a template strand of a nucleic acid (e.g., DNA) using a bioelectronic device. In accordance with these embodiments, the method includes introducing a template polynucleotide to the bioelectronic device. In some embodiments, the bioelectronic device comprises a polymerase functionally coupled to at least one of a first electrode and a second electrode. In some embodiments, the method further includes introducing a solution comprising four nucleotidepolyphosphate monomers (e.g., dNxPs) to the device comprising the template polynucleotide. In some embodiments, at least three of the four nucleotidepolyphosphate monomers present in the solution comprises a distinctive charge relative to its corresponding standard nucleotidetriphosphate monomer. In some embodiments, the method further includes obtaining a bioelectronic signature of polymerase activity based on current fluctuations as each complementary nucleotidepolyphosphate monomer is incorporated into the template polynucleotide. In some embodiments, at least one characteristic of the bioelectronic signature identifies each of the complementary nucleotidepolyphosphate monomers incorporated into the template polynucleotide.

As one of ordinary skill in the art will readily recognize and appreciate after having benefited from the teachings of the present disclosure, the methods described herein can be used with any bioelectronic device that senses the duration of the open and closed states of an enzyme (e.g., polymerase). Exemplary devices include, but are not limited to, the bioelectronic devices and systems disclosed in U.S. Pat. No. 10,422,787 and PCT Appln. No. PCT/US2019/032707, both of which are herein incorporated by reference in their entirety and for all purposes. Additionally, it will be readily recognized and appreciated by those of ordinary skill in the art based on the present disclosure that the forgoing embodiments apply equally to (and include) sequencing RNAs with the substitution of rNTPs for dNTPs and the use of an RNA polymerase.

Further, one of ordinary skill in the art would readily recognize and appreciate that the methods described herein can be used in conjunction with other methods involving the sequencing of a biopolymer. In particular, the various embodiments disclosed in PCT Application No. PCT/US21/19428, which is herein incorporated by reference in its entirety, describes the interpretation of current fluctuations generated by a DNA polymerase as it actively extends a template, and how signal features (e.g., bioelectronic signature) may be interpreted in terms of the nucleotide being incorporated, and thus, how these signals can read the sequence of the template. This approach utilizes features of the signal that vary in time. For example, the time that the polymerase stays in a low current state reflects the concentration of the nucleotidetriphosphate in solution. If the concentration of a particular nucleotide triphosphate is low, then the polymerase must stay open for a longer time in order to capture the correct nucleotide, and since the open conformation of the polymerase corresponds to a lower current, the dip in current associated with the open state lasts for longer. Additionally, the various embodiments disclosed in PCT Application No. PCT/US20/38740, which is herein incorporated by reference in its entirety, describes how the base-stacking polymerization rate constant differences are reflected in the closed-state (high current states) so that the duration of these states may also be used as an indication of which one of the four nucleotides is being incorporated. It can be desirable to be able to use the amplitude of the signal as yet an additional contribution to determining sequence. Further, the various embodiments disclosed in PCT Application No. PCT/US21/17583, which is herein incorporated by reference in its entirety, describes methods that utilize a defined electrical potential to maximize electrical conductance of a protein-of-interest (e.g., polymerase), which can serve as a basis for the fabrication of enhanced bioelectronic devices for the direct measurement of protein activity.

Figure 2:
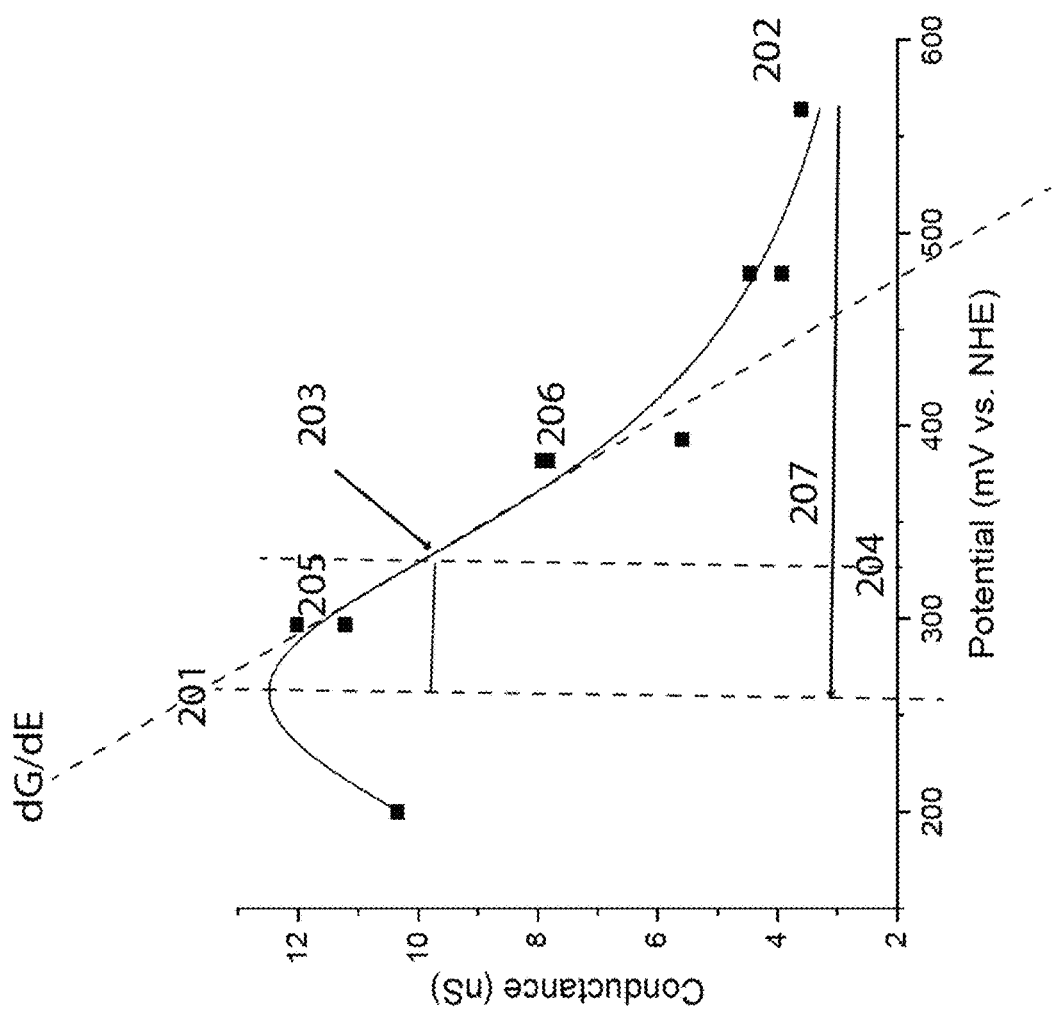
FIG. 2: Representative graph showing how the electronic conductance of a polymerase molecule depends upon local charge (expressed in terms of surface potential).
Figure 3A:
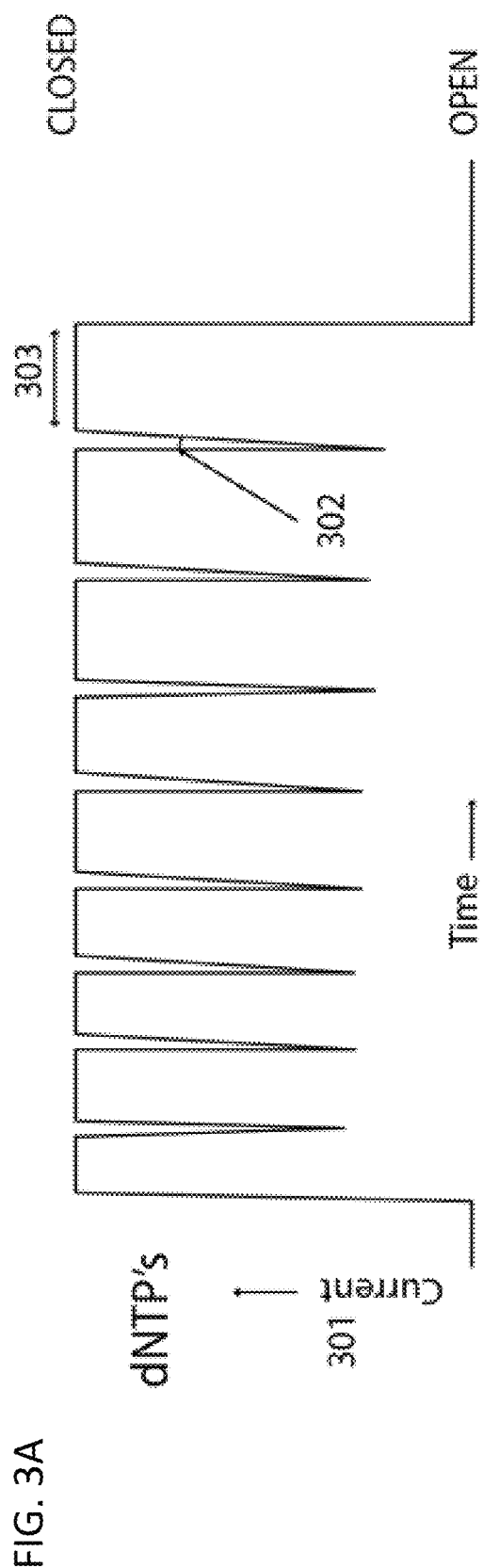
FIGS. 3A-3B: Representative graphs of current vs. time as measured through a polymerase incorporating deoxynucleotidetriphosphates.
Figure 3B:
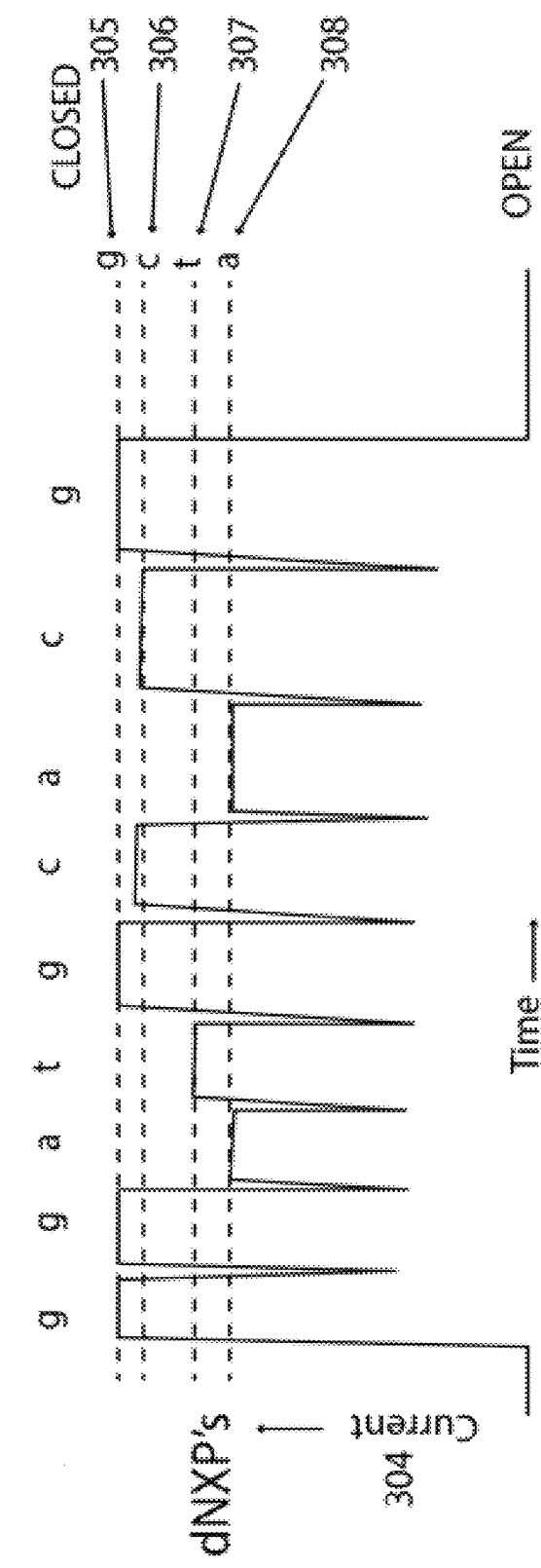

In accordance with the above embodiments, the present disclosure includes methods of sequencing using nucleotidepolyphosphates (e.g., dNxPs) having distinctive charges (e.g., more positive or more negative relative to their corresponding standard nucleotidetriphosphate monomer) to generate a bioelectronic signature that can be used to identify each of the complementary nucleotidepolyphosphate monomers (see, e.g., FIG. 1) incorporated into a template polynucleotide. In some embodiments, the bioelectronic signature comprises a closed period corresponding to the polymerase being in a closed state (e.g., nucleotide incorporation). In some embodiments, at least one characteristic of the bioelectronic signature comprises current amplitude level, such as a change (e.g., increase or decrease) in the current amplitude level based on the incorporation of a particular nucleotidepolyphosphate monomer having a distinctive charge relative to its corresponding standard nucleotidetriphosphate monomer (FIGS. 3A-3B). As described further herein, the electrical conductance of a polymerase varies depending on local charge (expressed in terms of surface potential; see FIG. 2), which can be altered by nucleotidepolyphosphate monomers having distinctive charges, and which provide a basis for identifying which monomer has been incorporated into a particular template nucleic acid sufficient to determine the sequence of that template nucleic acid.

In some embodiments, at least one of the nucleotidepolyphosphate monomers present in a solution (e.g., a solution comprising a bioelectronic device and a template nucleotide) has a distinctive negative charge relative to its corresponding standard nucleotidetriphosphate monomer. In some embodiments, at least two of the nucleotidepolyphosphate monomers present in a solution (e.g., a solution comprising a bioelectronic device and a template nucleic acid) have distinctive negative charges relative to their corresponding standard nucleotidetriphosphate monomer. In some embodiments, at least three of the nucleotidepolyphosphate monomers present in a solution (e.g., a solution comprising a bioelectronic device and a template nucleotide) have distinctive negative charges relative to their corresponding standard nucleotidetriphosphate monomer. In some embodiments, all four of the nucleotidepolyphosphate monomers present in a solution (e.g., a solution comprising a bioelectronic device and a template nucleotide) have distinctive negative charges relative to their corresponding standard nucleotidetriphosphate monomer.

In some embodiments, the negative charge is conferred by at least one additional phosphate group relative to its corresponding standard nucleotidetriphosphate monomer (FIG. 1). In some embodiments, the negative charge is conferred by 1 to 20 additional phosphate groups. In some embodiments, the negative charge is conferred by 1 to 19 additional phosphate groups. In some embodiments, the negative charge is conferred by 1 to 18 additional phosphate groups. In some embodiments, the negative charge is conferred by 1 to 17 additional phosphate groups. In some embodiments, the negative charge is conferred by 1 to 16 additional phosphate groups. In some embodiments, the negative charge is conferred by 1 to 15 additional phosphate groups. In some embodiments, the negative charge is conferred by 1 to 14 additional phosphate groups. In some embodiments, the negative charge is conferred by 1 to 13 additional phosphate groups. In some embodiments, the negative charge is conferred by 1 to 12 additional phosphate groups. In some embodiments, the negative charge is conferred by 1 to 11 additional phosphate groups. In some embodiments, the negative charge is conferred by 1 to 10 additional phosphate groups. In some embodiments, the negative charge is conferred by 1 to 9 additional phosphate groups. In some embodiments, the negative charge is conferred by 1 to 8 additional phosphate groups. In some embodiments, the negative charge is conferred by 1 to 7 additional phosphate groups. In some embodiments, the negative charge is conferred by 1 to 6 additional phosphate groups. In some embodiments, the negative charge is conferred by 1 to 5 additional phosphate groups. In some embodiments, the negative charge is conferred by 1 to 4 additional phosphate groups. In some embodiments, the negative charge is conferred by 1 to 3 additional phosphate groups. In some embodiments, the negative charge is conferred by 1 or 2 additional phosphate groups.

As would be recognized by one of ordinary skill in the art based on the present disclosure, the additional of other chemical moieties can also be used to alter the charge of the nucleotidepolyphosphate monomers (e.g., to be more negative than their corresponding standard nucleotidepolyphosphate monomers), provided they do not interfere with the function of the polymerase. Additionally, as disclosed in Dellafiore, M. A. et al., Front. Chem., 4 May 2016 (doi.org/10.3389/fchem.2016.00018) and by Duffy, K. et al., BMC Biology, 2 Sep. 2020 (doi.org/10.1186/s12915-020-00803-6) and McKenzie, L. K. et al., Chem. Soc. Rev., 1 Mar. 2021 (doi.org/10.1039/D0CS01430C) any modified nucleic acids (e.g. modified nucleobases, sugars, or phosphates) can be obtained according to various strategies. A phosphate charge may be eliminated with triazole linkages as demonstrated by Fujino, T. et al, J. Org. Chem. 31 Aug. 2016 doi.org/10.1021/acs.joc.6b01618) and a positively charged uridine may be incorporated as demonstrated by Vaish, N. K. et al., Biochemistry, 4 Jul. 2003 (doi.org/10.1021/bi027354i).

The design strategies of various modified nucleotides suitable for sequencing methodologies generally require that the modified nucleotides not disturb the base pair interactions (Watson-Crick and Hoogsteen); that the modified nucleotides be substrates of the corresponding DNA or RNA polymerases; the introduction of the modified nucleotide be efficient at any position of the sequence; and that the modified sequence be a template for the corresponding polymerases.

In some embodiments, a distinctive negative charge on the at least one nucleotidepolyphosphate monomer corresponds to an increased or decreased current amplitude level relative to the current amplitude level of its corresponding standard nucleotidetriphosphate monomer. For example, as shown in FIG. 2, depending on the peak conductance level, additional negative charges on a nucleotidepolyphosphate monomer (e.g., reduced potential) can correspond to an increase in current amplitude level in a bioelectronic signature (e.g., right side of 201 in FIG. 2), or can correspond to a decrease in current amplitude level in a bioelectronic signature (e.g., left side of 201 in FIG. 2). Thus, in some embodiments, a distinctive negative charge on at least one deoxynucleotidepolyphosphate monomer corresponds to an increased current amplitude level relative to the current amplitude level of its corresponding standard deoxynucleotidetriphosphate monomer. In other embodiments, a distinctive negative charge on at least one deoxynucleotidepolyphosphate monomer corresponds to a decreased current amplitude level relative to the current amplitude level of its corresponding standard deoxynucleotidetriphosphate monomer.

Similarly, in some embodiments, at least one of the nucleotidepolyphosphate monomers present in a solution (e.g., a solution comprising a bioelectronic device and a template nucleotide) has a distinctive positive charge relative to its corresponding standard nucleotidepolyphosphate monomer. In some embodiments, at least two of the nucleotidepolyphosphate monomers present in a solution (e.g., a solution comprising a bioelectronic device and a template nucleotide) have distinctive positive charges relative to their corresponding standard nucleotidepolyphosphate monomers. In some embodiments, at least three of the nucleotidepolyphosphate monomers present in a solution (e.g., a solution comprising a bioelectronic device and a template nucleotide) have distinctive positive charges relative to their corresponding standard nucleotidepolyphosphate monomers. In some embodiments, all four of the nucleotidepolyphosphate monomers present in a solution (e.g., a solution comprising a bioelectronic device and a template nucleotide) have distinctive positive charges relative to their corresponding standard nucleotidepolyphosphate monomers. As would be recognized by one of ordinary skill in the art based on the present disclosure, the addition of any chemical moiety can be used to alter the charge of the nucleotidepolyphosphate monomers (e.g., to be more positive than its corresponding standard nucleotidepolyphosphate monomer), provided it does not interfere with the function of the polymerase.

In some embodiments, a distinctive positive charge on the at least one nucleotidepolyphosphate monomer corresponds to an increased or decreased current amplitude level relative to the current amplitude level of its corresponding standard nucleotidepolyphosphate monomer. For example, as shown in FIG. 2, depending on the conductance peak value, additional positive charges on a nucleotidepolyphosphate monomer (e.g., increased potential) can correspond to a decrease in current amplitude level in a bioelectronic signature (e.g., right side of 201 in FIG. 2), or can correspond to an increase in current amplitude level in a bioelectronic signature (e.g., left side of 201 in FIG. 2). Thus, in some embodiments, a distinctive positive charge on at least one nucleotidepolyphosphate monomer corresponds to an decreased current amplitude level relative to the current amplitude level of its corresponding standard nucleotidepolyphosphate monomer. In other embodiments, a distinctive positive charge on at least one nucleotidepolyphosphate monomer corresponds to an increased current amplitude level relative to the current amplitude level of its corresponding standard nucleotidepolyphosphate monomer.

In accordance with these embodiments, examples of modified nucleotides, each carrying a different charge, include but are not limited to, deoxynucleotidepolyphosphates (dNxPs). The structure of four exemplary dNxPs are provided in FIG. 1. In this example, the chemical structure of deoxyadenosinetriphosphate 101, the normal triphosphate form is shown. Here, "x" refers to the number of phosphates attached to the nucleotides; for 101, x=3. Reference numbers 102, 103 and 104 correspond to deoxynucleotides with additional phosphate groups. In this example, 102 corresponds to a deoxythymidine tetraphosphate (x=4) carrying one additional electronic charge relative to 101; 103 corresponds to a deoxycytidine hexylphosphate (x=6) carrying three additional charges relative to 101; and 104 corresponds to a deoxyguanosine nonylphosphate (x=9) carrying six additional charges relative to 101. These structures provided in FIG. 1 are exemplary illustrations only. As would be recognized by one of ordinary skill in the art based on the present disclosure, there are many other ways of modifying the charge on the triphosphate of a normal nucleotide, including but not limited to, adding amine groups to induce a positive charge or sulfates of carboxylates to produce a negative charge at or near pH 7.0. Further variations are also possible, for example, by altering the pH so as to ionize moieties attached to the deoxynucleotides.

An exemplary mechanism of modulation of signal amplitude is illustrated in FIG. 2. This example demonstrates the conductance in nanoSiemens (nS) of a Φ29 polymerase as a function of its potential in mV on the Normal Hydrogen Electrode (NHE) scale. The solid line is a fit to a Lorentzian function:

$$G = A \frac{\Gamma^2}{(E_0 - E)^2 + \Gamma^2}$$

where E is the potential, $E_0$=259 mV and $2\Gamma$=183 mV. Away from the peak 201 or the tails 202 of the Lorentizian, the conductance is strongly dependent on potential. The region of maximum dependence of conductance on potential, $$\left(\frac{dG}{dE}\right)_{MAX},$$

203 on the positive potential side of the peak occurs at $$E_1 = E_0 + \frac{1}{\sqrt{3}}\Gamma$$

or about 320 mV, as marked 204. In this region, the slope, $$\left(\frac{dG}{dE}\right)_{MAX} \approx 0.05 \text{ nS/mV}.$$

The slope is similar in the region 205, which marks the potential when the polymerase is contacted by a Pd electrode and an Au electrode, and the region 206 which marks the potential when the polymerase is contacted by a Pt electrode and an Au electrode.

The change in potential ΔV of a polymerase binding a charged molecule can be estimated from the Coulomb charging energy of a sphere of radius a and dielectric constant ε. Taking the charge to be N units of e, the charge on an electron, $$\Delta V = \frac{Ne}{8\pi\varepsilon\varepsilon_0 a}$$

where $\varepsilon_0$ is the permittivity of free space, 8.85×10$^{-12}$ F/m. The phosphate chain will be bound at the catalytic site of the polymerase where the relative permittivity, ε, (also known as the dielectric constant) will be approximately 4. Taking the radius of a Φ29 polymerase to be 3.5 nm, the potential shift per unit added electronic charge is ~50 mV/e. The corresponding shift in conductance, ΔG is $$\Delta G = \Delta V \times \left(\frac{dG}{dE}\right)_{MAX}$$

leading to a conductance change of about 2.5 nS. This is a readily measurable change on going from a triphosphate (as in 101 in FIG. 1) to a tetraphosphate (as in 102 in FIG. 1). The shifts for larger numbers of phosphates will likely be smaller than given by this equation using the value of four for the relative dielectric constant. For example, a long polyphosphate such as 104 would protrude out into the surrounding solvent where the dielectric constant would approach 80, reducing the potential change by a factor 80/4=20. In this case, the potential shift per added phosphate would be reduced to 50 mV/20 or 2.5 mV, so that the last phosphates in the chain would contribute only 0.135 nS, a much smaller, but still a measurable amount.

In some embodiments, a bioelectronic device of the present disclosure includes a polymerase operated with a gold and a platinum electrode, poised at the potential 206. When the polymerase captures a dNxP with x>3, the negative charge on the polymerase increases relative to the case where it captures a regular dNTP, shifting its potential to lower values; and therefore, increasing the conductance during the closed conformation of the polymerase (during which the dNxP complementary to the template is bound). Thus, as long as the shifted potential at the most extreme values lay in a range 207 on one side of the peak 201, the effect of added negative charge distinguishes each nucleotide by an increased conductance in the order deoxyguanosine nonylphosphate (x=9)>deoxycytidine hexylphosphate (x=6)>deoxythymidine tetraphosphate (x=4)>deoxyadenosine triphosphate (x=3), using the examples of dNxPs shown in FIG. 1.

Additionally, FIG. 3 illustrates a signal 301 taken with all four deoxynuclotide triphosphates present. Here, the chemical identity of nucleotides is only evident in the duration of the open 302 or closed 303 states, as disclosed in PCT Application No. PCT/US21/19428. However, when each dNxP carries a distinctive charge, the current level in the closed state signals its identity as illustrated in 304. In the example just given, highest conductance state signals incorporation of a "g" base 305, the next level, 306, incorporation of a "c" base, the next, 307, a "t" base and the lowest, 308, an "a" base.

3. Bioelectronic Devices and Systems

In accordance with the above methods, the bioelectronic devices and systems of the present disclosure generally include a first electrode and a second electrode that are configured for contact with a sample (e.g., biopolymer sample) to be analyzed. In some embodiments, such as when the electrodes are planar, the first and/or second electrode do not require a dielectric layer. In other embodiments, the first and/or second electrode can have a dielectric layer. In some embodiments, the first and/or second electrode comprise a metal selected from gold, silver, copper, platinum, palladium, and ruthenium (or any alloys thereof). In some embodiments, the metal is palladium. In some embodiments, the methods of the present disclosure include applying a voltage bias between the first and second electrodes that is 100 mV or less. It will be recognized by one of ordinary skill in the art based on the present disclosure that the bioelectronic devices and systems of the present disclosure, according to the various methods described herein, can be used to sequence DNA and RNA polymers by similar techniques (e.g., sequence RNA polymers using an RNA dependent RNA polymerase and four different ribonucleotides each carrying a distinctive charge).

In some embodiments, the gap between the first and second electrode is a width of about 1.0 nm to about 50.0 nm. In some embodiments, the gap between the first and second electrode is a width of about 1.0 nm to about 40.0 nm. In some embodiments, the gap between the first and second electrode is a width of about 1.0 nm to about 30.0 nm. In some embodiments, the gap between the first and second electrode is a width of about 1.0 nm to about 20.0 nm. In some embodiments, the gap has a width of about 1.0 nm to about 10.0 nm. In some embodiments, the gap has a width of about 1.0 nm to about 7.5 nm. In some embodiments, the gap has a width of about 1.0 nm to about 5.0 nm. In some embodiments, the gap has a width of about 4.0 nm to about 5.0 nm.

In some embodiments, the polymerase can be attached to one electrode in one embodiment and to both electrodes in another embodiment. The polymerase can be attached to the electrode(s) either directly or indirectly. In some embodiments, the polymerase is attached to the electrode(s) via a linker. In some embodiments, the polymerase is attached to the electrode indirectly via interactions with a ligand attached to the electrode. In some embodiments, the polymerase is modified to incorporate a ligand-binding site. In some embodiments, the polymerase is a biotinylated polymerase. In some embodiments, the polymerase comprises an Avitag. In some embodiments, the polymerase is a biotinylated polymerase and is attached to the electrode via streptavidin. In some embodiments, the polymerase is modified to incorporate an amino acid residue that allows for click-chemistry attachment of other chemical groups to the electrodes (e.g., 4-Azido-L-phenylalanine.). In some embodiments, the exonuclease activity of the polymerase is disabled. In some embodiments, linker is attached to a region of the polymerase that is inactive.

When the polymerase is attached to both electrodes, the distance between the two attachment points is at least about 1 nm to about the overall size of the polymerase. In one embodiment, the distance is from about 1 nm to about 10 nm. In another embodiment, the distance is from about 3 nm to about 7 nm. In another embodiment, the distance is from about 5 nm to about 6 nm. In some embodiments, the distance is from about 2 to about 8 nm.

When the polymerase is attached to both electrodes, the two attachment points must not move relative to each other, when the polymerase undergoes open-to-closed conformational changes. The crystal structures of many polymerases are currently available (see, e.g., resb.org) in both open and closed forms. Thus, when choosing the two attachment points, the two residues must be separated from each other by distances that are similar to the gap between the electrodes used to contact the polymerase, such as between about 1 nm and about 10 nm. For example, in some embodiments, this distance is between 2 nm and 8 nm. In embodiments, the two attachment points have the same atomic coordinates in both the open and closed forms, to within half a nanometer.

In some embodiments, the polymerase incorporates an inserted flexible sequence. Any peptide can be used as the flexible sequence as long as (a) it does not form an alpha helix or a beta sheet and (b) the residues in the sequence do not substantially change the pI relative to the pI of the unmodified polymerase. It is contemplated that additional polymerases may be used so long as the modified polymerase functions efficiently which can be determined by a rolling-circle amplification assay.

In some embodiments, the device further comprises a nucleic acid template. The nucleic acid template can be a DNA template in one embodiment and an RNA template in another embodiment. For the polymerase to operate at maximum speed, and for the electrical signals to be readily processed, it is understood that the polymerase not be stalled or obstructed by secondary structures formed by the DNA template, such as when the template contains single stranded regions.

As described further herein, the various features or characteristics of a bioelectronic signature of an active protein-of-interest can be used to determine the sequence of a biopolymer. As would be recognized by one of skill in the art based on the present disclosure, the methods of obtaining a bioelectronic signature and extracting various characteristics described herein can be used to determine the sequence of any biopolymer using any corresponding enzyme-of-interest, including but not limited to a polymerase, a nuclease, a proteasome, a glycopeptidase, a glycosidase, a kinase and an endonuclease. In accordance with these embodiments, the present disclosure also provides bioelectronic devices and systems in which the charge on a protein-of-interest is altered in order to modulate the overall conductance of a protein complex (e.g., a protein-of-interest and corresponding linker). For example, the conductance of a given protein complex in a bioelectronic device configured with platinum electrodes can be modulated (e.g., increased) to be similar to the conductance provided by gold electrodes by altering the charge of the protein complex (e.g., shifting the potential). Thus, embodiments of the present disclosure include a bioelectronic device that includes a first electrode and a second electrode separated by a gap, and a protein (e.g., a polymerase) attached to the first and second electrodes via a linker comprising a distinctive electrical charge. In some embodiments, the distinctive electrical charge modulates conductance through the protein in a manner that enhances the function of the bioelectronic device (e.g., sequencing of a biopolymer).

In some embodiments, the linker used to generate a bioelectronic device of the present disclosure includes a peptide or polypeptide. In some embodiments, the linker comprises streptavidin. In some embodiments, the linker comprises streptavidin that has been modified to have a positive or negative charge (e.g., with polyglutamate). In some embodiments, the protein-of-interest is biotinylated. In some embodiments, the linker comprises a distinctive negative charge. In some embodiments, the distinctive negative charge is conferred by addition of a glutamate moiety, an aspartate moiety, or a combination thereof (including derivatives, variants, and polymers), coupled to the streptavidin. In some embodiments, the distinctive negative charge increases the conductance through the protein. In some embodiments, the linker comprises a distinctive positive charge. In some embodiments, the distinctive positive charge is conferred by addition of an arginine moiety, a histidine moiety, a lysine moiety, or a combination thereof (including derivatives, variants, and polymers), coupled to the streptavidin. In some embodiments, the distinctive positive charge increases or decreases the conductance through the protein.

Figure 4:
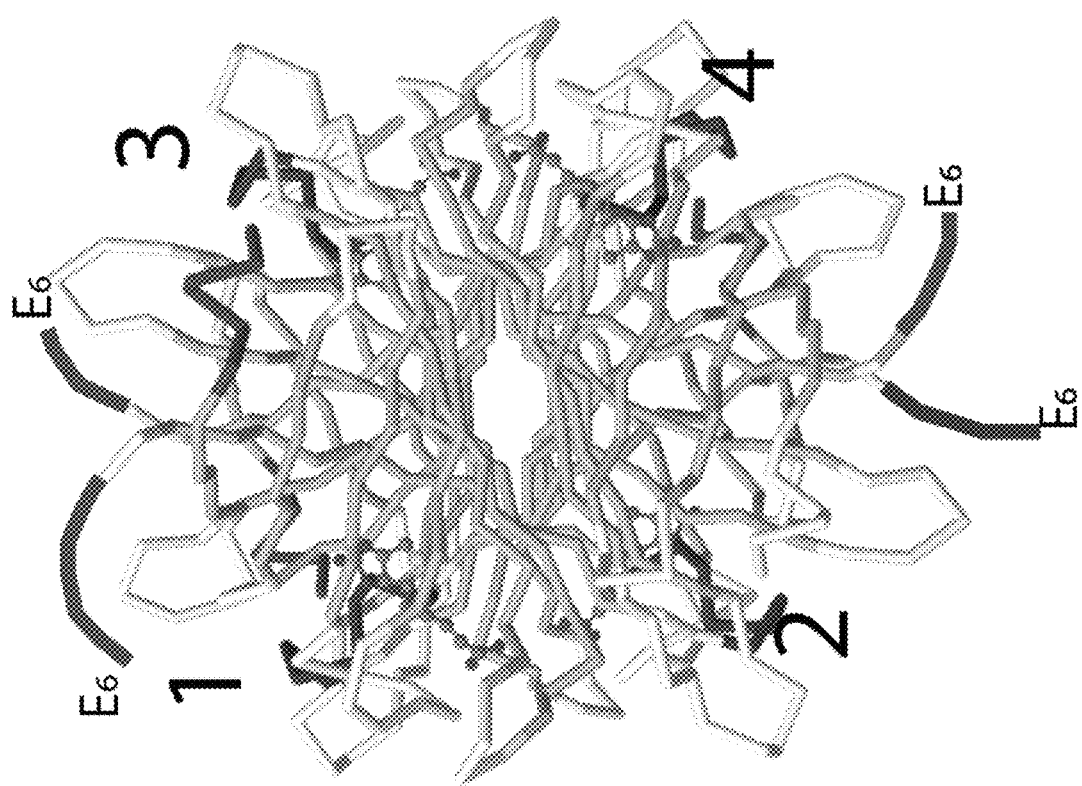
FIG. 4: Representative diagram of the backbone structure of a hexagluamate mutant streptavidin showing the charged tails (E6) attached to the C termini of each of the streptavidin monomers.

As described further herein, the influence of charge on electronic transmission was demonstrated by comparing conductance obtained with a wild-type streptavidin with that of a streptavidin molecule containing an additional hexaglutamate (six negative charges) tail at the C terminus of each of the four monomers that comprise the streptavidin tetramer. FIG. 4 includes a representative diagram of the backbone structure of a hexagluamate mutant streptavidin showing the charged tails (E6) attached to the C termini of each of the streptavidin monomers labeled (1, 2, 3, 4) next to the point where the biotin ligand emerges from the protein monomers. The four hexaglutamate tails 401, 402, 403, and 404 are labeled E6.

FIGS. 5A-5B include representative conductance distributions for wild-type (FIG. 5A) and the hexagluamate mutant streptavidin (FIG. 5B) measured at a 2.5 nm gap using Pd electrodes. The highest conductance peaks in each case (501, 502) correspond to the desired maximum bonding between the electrodes. These measurements were made with Pd electrodes. For the wild-type, the conductance of the highest peak is 6.8 nS. For the E6 mutant, it is 21.38 nS. Thus, the conductance has increased by 14.58 nS with the addition of 24 electronic charges. This is about 0.6 nS per electronic charge, less than the maximum estimated above, but large enough to be readily measured.

Charge modulation of conductance confers several advantages, including but not limited to, increasing the conductance of a complex using electrodes whose rest potentials place them far from the peak of the conductance vs. potential curve (see, e.g., FIG. 2). Peak conductances can be obtained with gold or gold-palladium combinations of electrodes, but gold has various limitations as an electrode material in many semiconductor processes. Therefore, it is advantageous to use other metals, such as Pt or Pd or other noble metals, but doing so can lead to a reduced signal. Thus, as provided herein, the signal can be restored or enhanced by altering the charge of the protein complex (e.g., using a modified streptavidin as a linker).

Figure 6A:
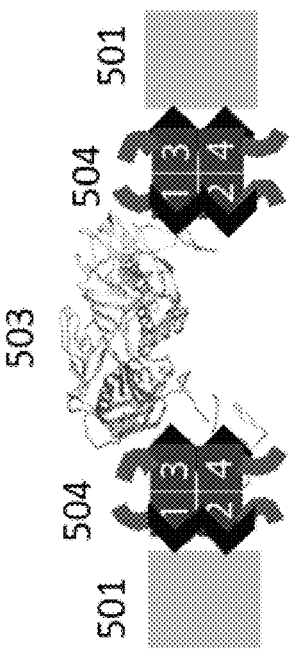
FIGS. 6A-6B: Representative diagrams of streptavidin-linked Φ29 polymerases bridging electrode pairs using wildtype streptavidin (FIG. 6A) and the hexagluamate mutant streptavidin (FIG. 6B). The corresponding conductance distributions measured at a 4.5 nm gap with Pd electrodes are provided in the graphs below each diagram.
Figure 6A:
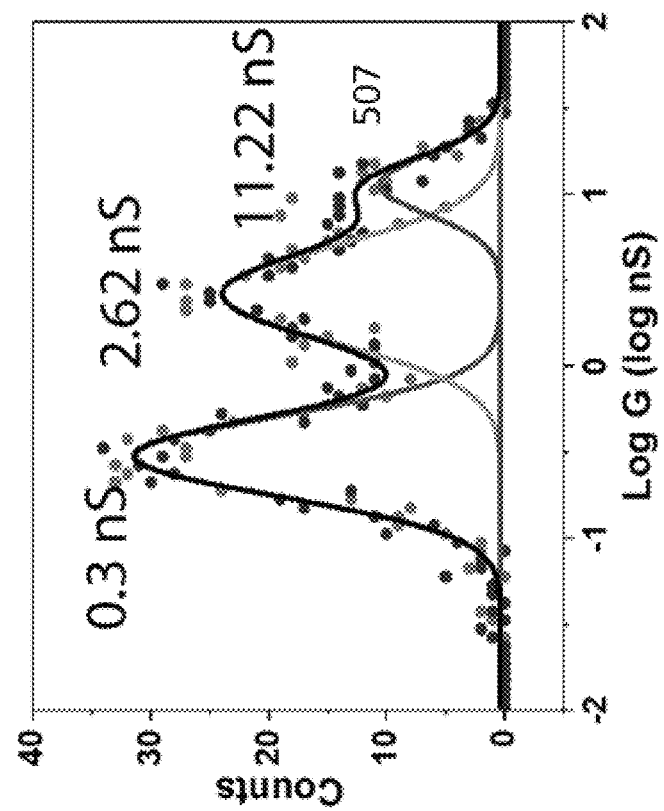
Figure 6B:
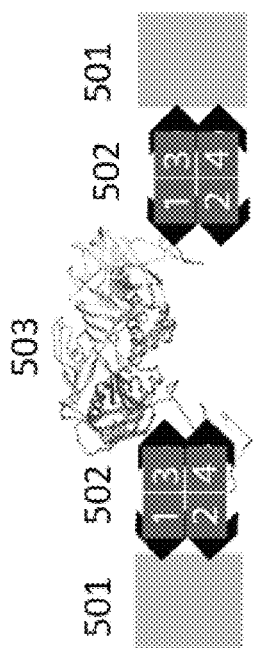
Figure 6B:
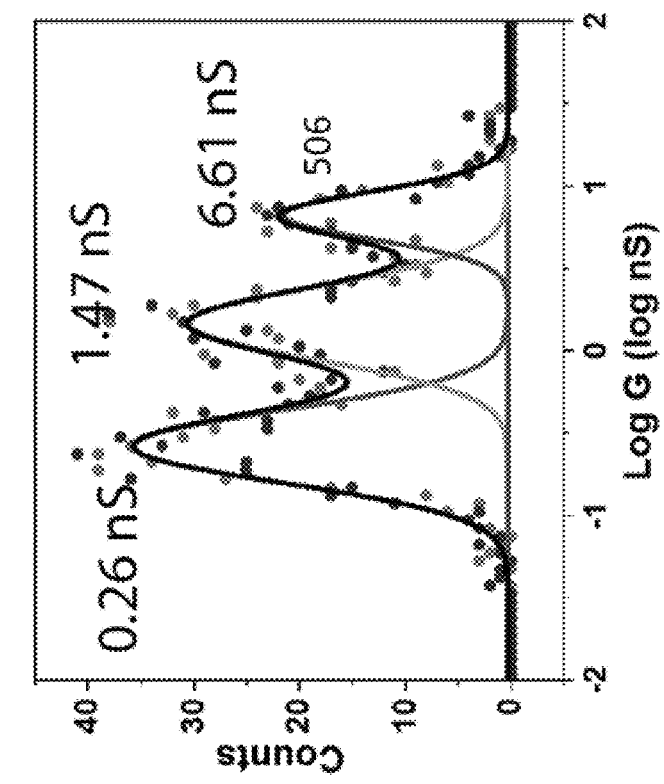

FIGS. 6A-6B includes representative diagrams of streptavidin-linked Φ29 polymerases bridging electrode pairs using wildtype streptavidin (FIG. 6A) and the hexagluamate mutant streptavidin (FIG. 6B). The corresponding conductance distributions measured at a 4.5 nm gap with Pd electrodes are provided in the graphs below each diagram. The graphs in FIGS. 6A and 6B include conductance distributions for a doubly-biotinylated Φ29 503 polymerase coupled to biotinylated electrodes 501 by wildtype streptavidin 502. The peak conductance 506 is 6.61 nS for the Pd electrodes used in this example. FIG. 6B shows the conductance distribution measured for the same complex on Pd electrodes, but with the hexaglutamate mutant streptavidin used as connectors 504. The conductance peak 507 is increased to 11.22 nS. While this effect is demonstrated here for streptavidin molecules, it readily can be applied to any other type of protein molecule used as a connector, as would be recognized by one of ordinary skill in the art based on the present disclosure.

In accordance with the above embodiments, a polymerase can be functionally coupled to a first and second electrodes using a linker comprising streptavidin. In some embodiments, the polymerase is biotinylated. In some embodiments, the linker is attached to a region of the polymerase that is inactive. In some embodiments, the polymerase and the first and second electrodes are biotinylated, and the linker comprises a streptavidin molecule comprising at least two biotin binding sites. In some embodiments, the exonuclease activity of the polymerase is disabled. In some embodiments, the gap has a width of about 1.0 nm to about 20.0 nm. In some embodiments, the first and second electrodes are separated by a dielectric layer. In some embodiments, the method comprises applying a voltage bias between the first and second electrodes that is 100 mV or less.

Embodiments of the present disclosure also include a system for direct electrical measurement of polymerase activity. In accordance with these embodiments, the system includes any of the bioelectronic devices described herein, a means for introducing dNTPs capable of interacting with the polymerase, a means for applying a voltage bias between the first and second electrodes that is 100 mV or less, and a means for monitoring fluctuations that occur as the dNTPs are incorporated into a template polynucleotide by the polymerase.

As persons of ordinary skill in the art will readily recognize and appreciate after having benefited from the teachings of the present disclosure, the methods described herein can be used with any bioelectronic device that senses the duration of the open and closed states of an enzyme (e.g., polymerase). Exemplary devices include, but are not limited to, the bioelectronic devices and systems disclosed in U.S. Pat. No. 10,422,787 and PCT Appln. No. PCT/US2019/032707, both of which are herein incorporated by reference in their entirety and for all purposes.

What is claimed is:

1. A bioelectronic device comprising:
 a first electrode and a second electrode separated by a gap; and
 a protein attached to the first and second electrodes via a linker at each attachment point comprising a distinctive negative electrical charge conferred by addition of at least one amino acid moiety;
 wherein the distinctive electrical charge modulates conductance through the protein.

2. The device of claim 1, wherein the linker comprises a streptavidin, and wherein the protein is biotinylated.

3. The device of claim 2, wherein the distinctive negative charge is conferred by the addition of a glutamate moiety, an aspartate moiety, or a combination thereof, coupled to the streptavidin.

4. The device of claim 1, wherein the first and/or the second electrode comprises gold, palladium, platinum, silver, copper, or any alloys thereof.

5. The device of claim 1, wherein the protein is selected from the group consisting of a polymerase, a nuclease, a proteasome, a glycopeptidase, a glycosidase, a kinase and an endonuclease.

6. The device of claim 1, wherein the linker is attached to an inactive region of the protein.

7. The device of claim 1, wherein the linker comprises streptavidin coupled to a polyglutamate moiety, the protein comprises a polymerase, and the first and second electrodes comprise palladium, platinum, or any alloys thereof.

8. The device of claim 1, wherein the protein is a polymerase and wherein the exonuclease activity of the polymerase is disabled.

9. The device of claim 8, wherein the linker comprises thio-streptavidin, and wherein the polymerase is functionally coupled to the first and second electrodes via the thio-streptavidin linker.

10. A method of modulating electronic conductance through a protein using the device of claim 1.

* * * * *